(12) United States Patent
Noraz et al.

(10) Patent No.: US 11,223,831 B2
(45) Date of Patent: Jan. 11, 2022

(54) METHOD AND SYSTEM OF VIDEO CODING USING CONTENT BASED METADATA

(71) Applicant: Intel Corporation, Santa Clara, CA (US)

(72) Inventors: Frederic J. Noraz, Gattieres (FR); Jill M. Boyce, Portland, OR (US); Sumit Mohan, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/533,607

(22) Filed: Aug. 6, 2019

(65) Prior Publication Data

US 2019/0364282 A1 Nov. 28, 2019

Related U.S. Application Data

(63) Continuation of application No. 15/201,227, filed on Jul. 1, 2016, now Pat. No. 10,440,366.

(51) Int. Cl.
| | |
|---|---|
| *H04N 19/139* | (2014.01) |
| *H04N 19/15* | (2014.01) |
| *H04N 19/51* | (2014.01) |
| *H04N 19/176* | (2014.01) |
| *H04N 19/172* | (2014.01) |
| *H04N 19/182* | (2014.01) |
| *H04N 19/159* | (2014.01) |
| *H04N 19/102* | (2014.01) |
| *H04N 19/132* | (2014.01) |
| *H04N 19/134* | (2014.01) |
| *H04N 19/46* | (2014.01) |

(52) U.S. Cl.
CPC ......... *H04N 19/139* (2014.11); *H04N 19/102* (2014.11); *H04N 19/132* (2014.11); *H04N 19/134* (2014.11); *H04N 19/15* (2014.11); *H04N 19/159* (2014.11); *H04N 19/172* (2014.11); *H04N 19/176* (2014.11); *H04N 19/182* (2014.11); *H04N 19/46* (2014.11); *H04N 19/51* (2014.11)

(58) Field of Classification Search
CPC .... H04N 19/132; H04N 19/172; H04N 19/31; H04N 19/46; H04N 19/51; H04N 19/587; H04N 19/61; H04N 19/895; H04N 19/65; H04N 19/114; H04N 19/142; H04N 19/152; H04N 19/17; H04N 19/577; H04N 19/105; H04N 19/70; H04N 19/102; H04N 19/134; H04N 19/139; H04N 19/15; H04N 19/159; H04N 19/176; H04N 19/182
See application file for complete search history.

(56) References Cited

U.S. PATENT DOCUMENTS

| | | |
|---|---|---|
| 5,532,715 A | 7/1996 | Bates et al. |
| 5,708,845 A | 1/1998 | Wistendahl et al. |

(Continued)

OTHER PUBLICATIONS

Notice of Allowance for U.S. Appl. No. 15/282,508, dated Feb. 4, 2020.

(Continued)

*Primary Examiner* — Jonathan R Messmore

(74) *Attorney, Agent, or Firm* — Essential Patents Group, LLP.

(57) ABSTRACT

Techniques related to video coding using content based metadata.

25 Claims, 13 Drawing Sheets

(56) References Cited

U.S. PATENT DOCUMENTS

| | | | |
|---|---|---|---|
| 5,899,575 A * | 5/1999 | Okayama | G06T 9/007 386/200 |
| 5,973,663 A | 10/1999 | Bates et al. | |
| 6,169,573 B1 | 1/2001 | Sampath-Kumar et al. | |
| 6,269,215 B1 * | 7/2001 | Okayama | G06T 9/007 386/220 |
| 6,496,981 B1 | 12/2002 | Wistendahl et al. | |
| 7,577,978 B1 | 8/2009 | Wistendahl et al. | |
| 7,991,053 B2 | 8/2011 | Raveendran | |
| 8,094,720 B2 * | 1/2012 | Lim | H04N 19/109 375/240.13 |
| 9,076,210 B2 | 7/2015 | Park | G06T 9/004 |
| 9,467,659 B2 | 10/2016 | Raveendran | |
| 9,531,990 B1 * | 12/2016 | Wilkins | H04N 7/00 |
| 2001/0053271 A1 * | 12/2001 | Okayama | H04N 9/8042 386/302 |
| 2002/0056136 A1 | 5/2002 | Wistendahl et al. | |
| 2003/0081850 A1 | 5/2003 | Karczewicz et al. | |
| 2003/0122941 A1 * | 7/2003 | Okayama | H04N 5/9261 348/231.2 |
| 2004/0170330 A1 | 9/2004 | Fogg | |
| 2005/0213663 A1 | 9/2005 | Aoyama et al. | |
| 2005/0265461 A1 | 12/2005 | Raveendran | |
| 2005/0281337 A1 * | 12/2005 | Kobayashi | H04N 19/105 375/240.18 |
| 2006/0171584 A1 | 8/2006 | Sandrew | |
| 2007/0071398 A1 | 3/2007 | Raveendran et al. | |
| 2007/0074266 A1 * | 3/2007 | Raveendran | H04N 19/36 725/135 |
| 2007/0097130 A1 * | 5/2007 | Margulis | G06F 3/1431 345/501 |
| 2007/0140337 A1 * | 6/2007 | Lim | H04N 19/176 375/240.12 |
| 2008/0204592 A1 | 8/2008 | Jia et al. | |
| 2009/0274434 A1 | 11/2009 | Mei et al. | |
| 2010/0290672 A1 | 11/2010 | Nishino et al. | |
| 2011/0091122 A1 | 4/2011 | Park et al. | |
| 2011/0299785 A1 * | 12/2011 | Albu | G06F 16/40 382/209 |
| 2012/0027259 A1 | 2/2012 | Bruijns et al. | |
| 2012/0056874 A1 | 3/2012 | Kim et al. | |
| 2012/0093221 A1 * | 4/2012 | Rodriguez | H04L 65/607 375/240.13 |
| 2012/0146891 A1 | 6/2012 | Kalinli | |
| 2013/0016032 A1 * | 1/2013 | Margulis | G06F 1/3203 345/2.3 |
| 2013/0142447 A1 * | 6/2013 | Park | H04N 19/107 382/233 |
| 2014/0098886 A1 | 4/2014 | Crenshaw et al. | |
| 2014/0201126 A1 * | 7/2014 | Zadeh | A61B 5/165 706/52 |
| 2014/0233645 A1 * | 8/2014 | Sakamoto | H04N 19/107 375/240.13 |
| 2014/0247197 A1 * | 9/2014 | Margulis | G06F 1/266 345/2.3 |
| 2014/0269919 A1 * | 9/2014 | Rodriguez | H04N 19/513 375/240.16 |
| 2014/0289241 A1 | 9/2014 | Anderson | |
| 2014/0294072 A1 * | 10/2014 | Elkhazin | H04N 19/172 375/240.12 |
| 2015/0040059 A1 * | 2/2015 | Yuan | G06T 13/80 715/784 |
| 2015/0078432 A1 * | 3/2015 | Wang | H04N 19/103 375/240.02 |
| 2015/0078445 A1 | 3/2015 | Wang et al. | |
| 2015/0172690 A1 | 6/2015 | Tsukagoshi | |
| 2015/0195566 A1 | 7/2015 | Hinz et al. | |
| 2015/0346984 A1 | 12/2015 | Flint et al. | |
| 2016/0212425 A1 * | 7/2016 | Zhu | H04N 19/132 |
| 2016/0330469 A1 | 11/2016 | Amer et al. | |
| 2017/0094311 A1 * | 3/2017 | Chou | H04N 19/186 |
| 2017/0324973 A1 * | 11/2017 | Tanner | H04N 19/523 |
| 2017/0359588 A1 * | 12/2017 | Tanner | H04N 19/164 |

OTHER PUBLICATIONS

Final Office Action for U.S. Appl. No. 15/282,508, notified Jul. 31, 2019.

Notice of Allowance for U.S. Appl. No. 15/201,227, dated May 22, 2019.

Office Action for U.S. Appl. No. 15/201,227, dated Oct. 18, 2018.

Office Action for U.S. Appl. No. 15/282,508, notified Jan. 10, 2019.

* cited by examiner

602 OBTAIN TEMPORAL DISPLAY CONTENT INFORMATION OF IMAGE DATA OF FRAMES OF A FRAME SEQUENCE AND RELATED TO THE COMPARISON OF AT LEAST TWO FRAMES OF THE FRAME SEQUENCE AND TO BE USED TO RENDER THE FRAMES

604 OBTAIN PIXEL IMAGE DATA OF THE FRAMES TO ENCODE THE FRAME SEQUENCE

606 DETERMINE A PREDICTION MODE OF AT LEAST ONE PORTION OF AT LEAST ONE FRAME OF THE FRAME SEQUENCE TO BE USED TO ENCODE THE PIXEL IMAGE DATA OF THE AT LEAST ONE PORTION AND BASED ON, AT LEAST IN PART, THE TEMPORAL DISPLAY CONTENT INFORMATION

METHOD AND SYSTEM OF VIDEO CODING USING CONTENT BASED METADATA

CLAIM OF PRIORITY

This application is a continuation of and claims priority to U.S. patent application Ser. No. 15/201,227, filed on Jul. 1, 2016, and titled "METHOD AND SYSTEM OF VIDEO CODING USING CONTENT BASED METADATA", which is incorporated by reference in its entirety for all purposes.

BACKGROUND

Due to ever increasing video resolutions, and rising expectations for high quality video images, a high demand exists for efficient image data compression of video while performance is limited for coding with existing video coding standards such as H.264, Advanced video coding (AVC), or H.265/HEVC (High Efficiency Video Coding), and other video coding standards. The aforementioned standards use expanded forms of traditional approaches to address the insufficient compression/quality problem, but often the results are still insufficient and require a large amount of energy to compute the results.

The conventional video coding processes use inter-prediction at an encoder to reduce temporal (frame-to-frame) redundancy. This is accomplished by first performing motion estimation to determine where the same or similar image data has moved between a reference frame and a current frame being analyzed. The frames are often partitioned into blocks, and the motion is represented by a motion vector that indicates where a block has moved from frame-to-frame. Motion compensation is then performed to apply the motion vector to construct a prediction block for a current frame to be reconstructed. A prediction mode selector then compares candidate predictions including those from the inter-prediction and other techniques such as intra-prediction to determine a best prediction mode for a block. For the selected best prediction mode, the difference in image data of a block between the prediction and real (original or actual) data is called the residual data and is compressed and encoded together with the motion vector when inter-prediction is selected as the best prediction mode.

Motion estimation often includes a search on a reference frame for one or more blocks that match a block being analyzed on the current frame. The searching is very computationally intensive when a large number of pixels over a wide area of a screen or frame require such searching. In order to limit brute searches, a motion vector previously determined on one or more spatial neighbor blocks may be used to determine a motion vector on a current block on the same frame. Since a block is relatively small compared to the size of a screen, however, from 64×64 bits to 4×4 bits depending on the standard, this still is very computationally heavy. Thus, these motion vector determining techniques consume a large amount of memory bandwidth and power, especially when large areas of a frame require such motion estimation techniques.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 6 is a flow chart of a method of video coding using display-related metadata according to the implementations herein;

DETAILED DESCRIPTION

Figure 1:
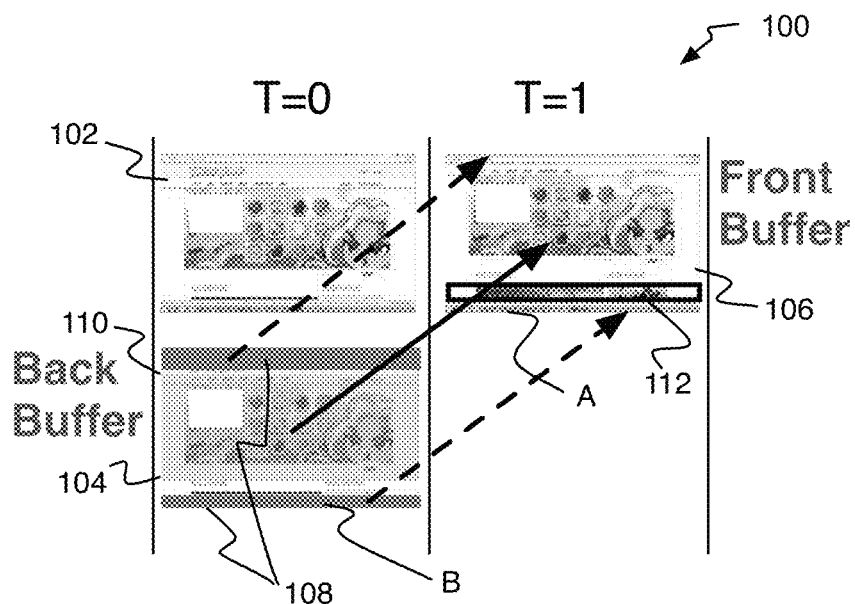
FIG. 1 is a schematic diagram showing frames in multiple display buffers.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, televisions, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to effect such feature, structure, or characteristic in connection with other implementations whether or not explicitly described herein.

Systems, mediums, and methods are described below related to video coding using content based metadata according to the implementations herein.

In the field of video encoding, the memory bandwidth and power required to encode video frames is directly related to the number of pixels per frame, the frame rate, and the encoder settings. Regarding the encoder settings, it is further known that the motion estimation and mode decision functions for inter-prediction are some of the most computationally intensive tasks. Specifically, in inter-prediction, the motion of a block of image data from one frame to another frame in a video sequence is determined by a number of different ways. One is brute force block matching that searches a reference frame for a block that matches a block on a current frame, and the difference in position (or offset) between the blocks is a motion vector (MV). The MV is then used to compute a prediction of image data for the current block, and this prediction may be one alternative prediction of a set of alternative candidate predictions provided to a prediction mode selector that selects the best prediction. Depending on the coding standard used such as HEVC, the prediction mode selector may compare different alternative candidate predictions that are based on different block sub-divisions of the same main coding unit or coding tree unit block where each alternative may be using at least some different motion vectors. The selected prediction is used to generate a residual (the difference between original image data and the predicted image data of the current block) which is then compressed and transmitted to a decoder. Some alternative strategies use previously generated MVs of other spatial neighbor blocks on the same frame as the current block to compute the MV of the current block. As mentioned, the relative amount of computations and time to determine the MVs and to make the mode selection can be very large in order to achieve high compression gains which consumes a large memory bandwidth as well as power, especially when the inter-prediction computations are applied to a relatively large section of pixels in a frame.

To resolve these issues, a method and system are derived to reduce the area on a frame that the system must apply the inter-prediction or otherwise reduce the computational load in order to perform the inter-prediction. This is accomplished by using a priori knowledge about the content information which is to be video encoded, where the term a priori herein generally refers to previously obtained. Particularly, a computer operating system (OS), and its display window manager (DWM), may render image content, such as a web browser or other graphic computer applications by some possible examples, before compressing and transmitting that content to be displayed on other devices. This may occur in a number of different situations such as a preview screen while a video is being recorded before transmitting the content to another device, short range mirroring networks that display images on a computer such as a laptop, smartphone, and/or tablet before transmitting them to a nearby large television for group viewing for entertainment or for a business meeting. Another example may be the preview image of oneself in an internet video-conference before the content is transmitted to the other party. Otherwise, any computer with its own display on the same network as an encoder, decoder, and the decoder's display may be displaying the images on the encoder side before transmitting them to one or more people where images need to be shared or for a video conference or meeting for example. In these situations, the computer transmitting the image content may or may not be in the same room as the meeting, such as with a webinar type of situation, where each person may have a computer with a decoder and a display. Many different examples are possible.

In these situations where the content (frame sequence) is displayed at the source, usually without first being compressed and decompressed, it may occur before encoding and transmitting the frame sequence to be displayed on another device. An OS may generate visual or display content information regarding which portions of an image or frame remain the same and in the same position from frame-to-frame (clean or static), which parts of an image have the same data but are shifted vertically and/or horizontally (scrolled), and which parts of the image have new image data (dirty) in order to minimize which areas of a frame need to be rendered from one consecutive frame to another Referring to FIGS. 1-2 to explain this concept by one example, a multiple buffer system is used that has at least two buffers. The example here is a two-buffer flip-chain (or ping pong) system 100 is shown for displaying images at a source device or encoder side device as explained above and by this example, without compressing the image data to display the frame sequence. In a double buffer system, two buffers are provided, a back buffer and a front buffer. The back buffer always receives the image data first while a display controller of a video encoder can operate on the pixels in the front buffer. Once the operations for constructing the image are over (in either the front or back buffer), the front and back buffer are swapped: the back buffer becomes the front buffer and the front buffer becomes the back buffer. With this arrangement, a first image may be read for display while a second or next image is being constructed. The display content information is used to minimize the work required to generate content in the front buffer. This is this same information that we aim to use when the content in the front buffer is sent to a video encoder for compression.

A region 108 of frame 104 in a back buffer B is considered a static or clean area because it does not change in image content and position from frame to frame. This is often the frame (border) of an application while graphics content (text, images, animation) is being rendered in the middle of the frame by some examples. In the present flip chain configuration, this static area 108 has already been rendered in frame 102 in the front buffer and does not need to be redrawn or copied from 104 to 106. The dashed arrow simply shows that static area from Buffer B to a front Buffer A has not changed.

A scroll area 110 is shifted upward vertically in the frame from frame 104 in the back buffer (buffer B) at time T=0, to the next frame 106 in the front buffer A at time T=1. A close-up of frame 106 is provided in FIG. 2 to more clearly show the regions 108, 110, and 112. The solid arrow shows how the scrolled area 110 is copied and moved from buffer B to the front buffer (Buffer A). Thus, the same content, and therefore the same chroma and luminance image data, is used except in a different vertical position on the frame than the last frame.

A dirty or new image data area 112 shows new content in frame 106 relative to that in previous frame 104. The application is expected to render new pixels for this part of the screen since this data is not available in previous frames. Similarly when this content is sent to a video encoder there is no a priori knowledge about the motion vectors in this region and the encoder will perform mode prediction processing as with any other image data without a priori data.

Conventionally, image data of a frame sequence would be passed on to the encoder without using this static (or skip), scroll, and dirty region classification content information or metadata. The method and system herein, however, recognize the importance of this content information, and use the content information to at least reduce the amount of inter-prediction and mode decision computations needed to be performed to generate a prediction mode decision and could reduce the amount of data to be transmitted for blocks in a frame by eliminating the need to transmit a residual for the block in some cases. This is accomplished by providing the static, scroll, and dirty region classifications to the encoder so that the prediction modes for blocks in a frame can be selected and coded according to the region classifications. This permits the omission of motion estimation computations when a block is found to be in a skip or scroll region greatly reducing the memory bandwidth and power needed to provide the prediction mode selection and prediction for coding for the blocks in these regions.

By other options, the region classifications may be provided at a block granularity and these display metadata blocks may be provided to the encoder to be used to decide whether to further sub-divide a block of the coding tree to form prediction unit partitions. In another option, the metadata blocks may be provided in modified or optimized sizes and arrangements to be used as the encoder's partitioned prediction units either replacing the encoders partitions or being used instead of the encoder determining partitions unrelated to the metadata content information in the first place.

The result of these methods using content information metadata or display (or visual) content information as a priori information for an image to be encoded is to reduce the amount of pixels for which motion estimation and mode decision are required, and optionally provide hints or the sub-block arrangement itself as the best way for the encoder to partition the blocks of the frame into sub-blocks. This enables significant reduction in power and memory bandwidth for encoding a video sequence.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder.

Figure 3:
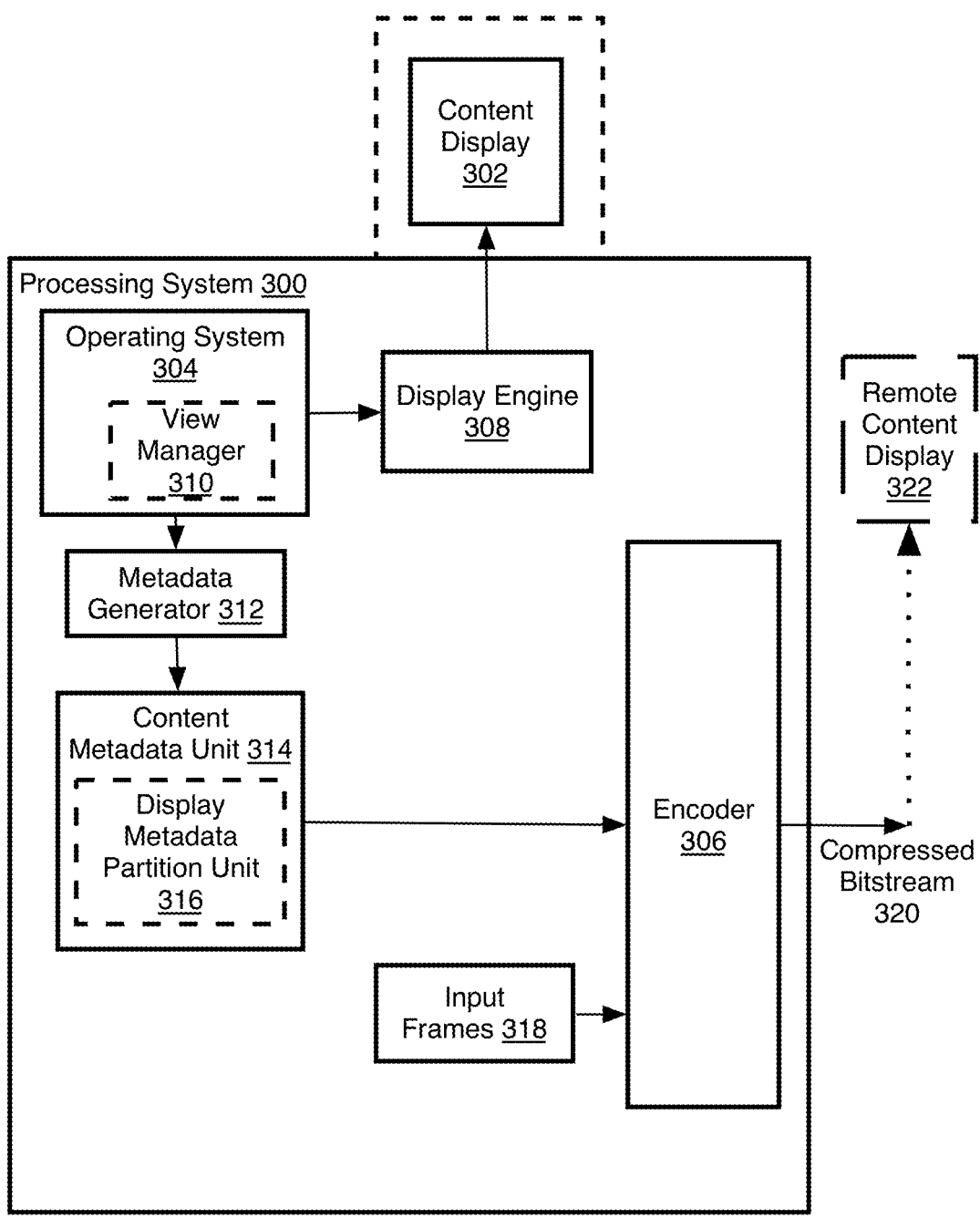
FIG. 3 is a schematic diagram of an image processing system in accordance with the implementations herein.

Referring to FIG. 3, an example processing system 300 is provided that has both a display 302 operated by an operation system (OS) 304 to display visual content including images, video sequences, and so forth, and an encoder 306 to compress and transmit the image data of the video sequences to be displayed on a remote receiving device that can also display the video sequences. Thus, system 300 may be a computer that performs many different tasks in addition to the image processing tasks that are relevant to the present description. The system 300 may have a display 302 that is a separate monitor connected by cable to the computer, or as shown by the dashed line around display 302, the display may be an integral component of the system 300 such as with a laptop computer, tablet, smartphone, and so forth. It will be understood that display 302 could also be connected wirelessly to the system 300.

The OS 304 may be many different operating systems and is not limited to any one such OS as long as it has or communicates with a view manager 310 such as a desktop windows manager (DWM) by one example that may or may not be considered a part of the OS, and as long as the OS or other component communicating with the OS can provide the display metadata described herein. The OS communicates with a display engine 308 that operates the display 302 and may run hardware such as a display driver or controller. By one possible non-limiting example, the OS may be Windows OS DirectX Graphics Infrastructure (DXGI) that provides a flip presentation model and that tracks the static and scroll regions to reduce the amount of data to be generated for displaying a frame as mentioned above.

By the examples provided herein, the system 300 does not compress the images that are processed for display on the displays 302 or 322. In some cases, the display 302 may be considered local displays but not always. In some alternative cases, an encoder could also be provided for the display driver or engine 308 to compress images to be displayed at display 302. In the latter case, the content information may be provided to a different encoder, or the encoder 306 may be provided at display engine 308, to compress the image data for transmission of the image data while content information is being retrieved for further display and further compression. The present methods discussed herein apply as long as the content information is being provided and used by an encoder to compress image data at some point.

During processing of the image data for display, the definitions of the static, scroll, and dirty regions may be determined by a metadata generator unit 312 that also may generate metadata for many different types of information regarding the screen content, and by using the data provided by the OS. Once the static, scroll, and dirty regions are defined for an image, the region information may be extracted by a content metadata unit 314 to provide the region information data to the encoder 306. By some options explained below, and whether as part of the content metadata unit 314 or as part of the encoder or both, a display metadata partition unit 316 may be provided to divide the frames into blocks compatible to those block sizes and arrangements used by the encoder 306 and then assign a region classification to each block depending on which region (static, scroll, or dirty) the block resides. This may be performed for a number of different block sizes such as 64×64 to 4×4 depending on the block size scheme of the encoder, and is discussed in greater detail below. The encoder then may consider these block sizes and arrangements when performing Code tree block (CTB) sub-division determinations to generate prediction blocks. By one form, the display metadata partition unit 316 may even adjust the block sizes to provide optimal prediction block sizes that can be used by the encoder to replace the blocks generated by the encoder or to provide metadata blocks rather than have the encoder performing the sub-division decisions. Many details are provided below.

The image data of the frames of the video sequence 318 and the display content information are synchronously provided to the encoder to generate the prediction block partitions, prediction mode decisions, and residuals for the blocks on the frames of the video sequence. The compressed bitstream 320 then may be sent over a radio by one example, such as a radio 1418 (FIG. 14) or by cable to a sink device with a decoder to show the images on a remote content display 322 by some examples. The remote display can have any display or screen configuration consistent with that described herein.

Figure 4:
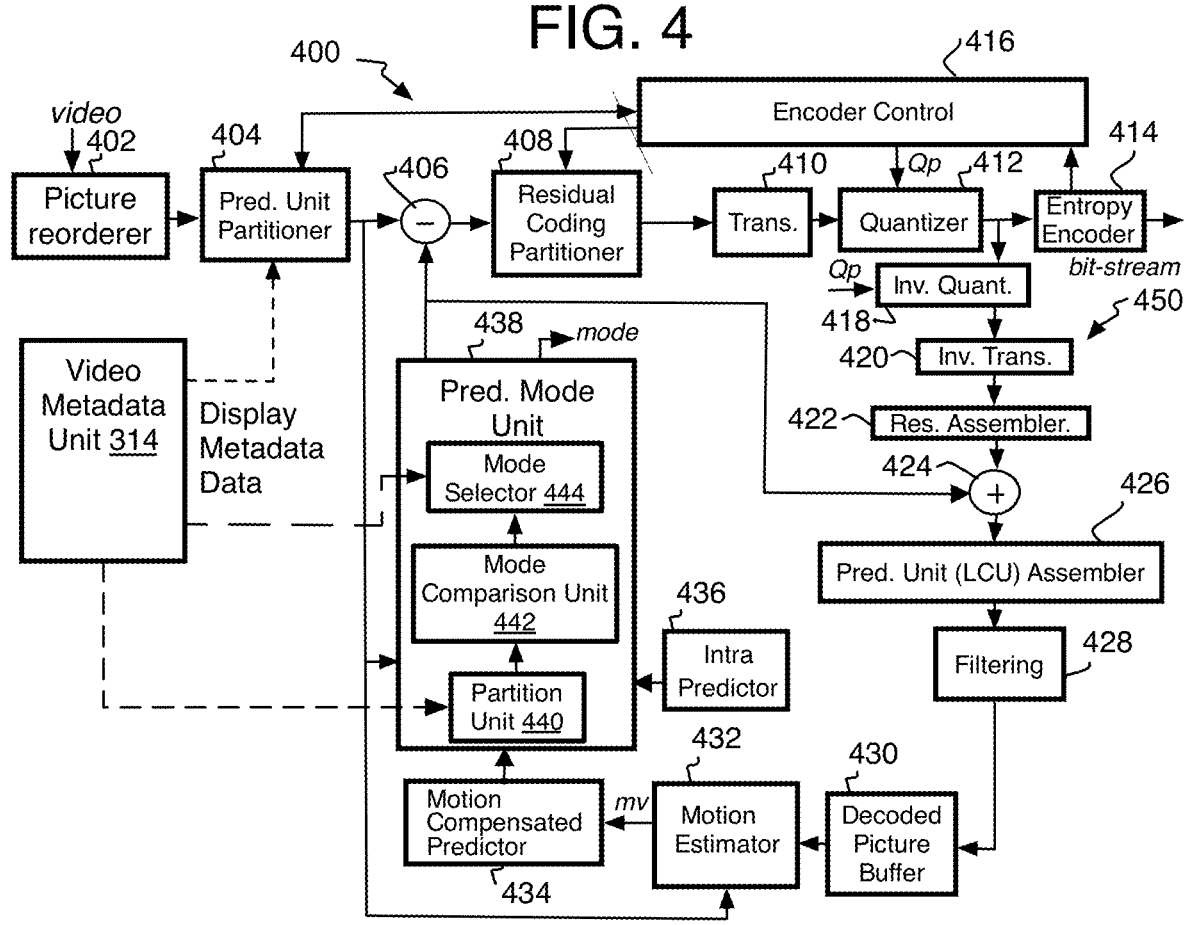
FIG. 4 is a schematic diagram of an example encoder for an image processing system.

Referring to FIG. 4, an example video coding system 400 may be an encoder where current video information in the form of data related to a sequence of video frames may be received for compression. The encoder 400 may be receiving display content information or metadata from a content metadata unit 314 as described with system 300 and may or may not be considered a part of the system 400. The system 400 may partition each frame into smaller more manageable units and may or may not use the display content information to consider how to form these units, and then use those units to determine a best prediction mode for the unit, also which may be determined by considering the display content information. Once the best prediction mode is determined, if a difference or residual is determined between an original block and a prediction, that resulting residual is transformed and quantized, and then entropy encoded and transmitted in a bitstream out to decoders or storage. To perform these operations, the system 400 may include an input picture buffer (with optional picture re-orderer) 402, a prediction unit partitioner 404, a subtraction unit 406, a residual partitioner 408, a transform unit 410, a quantizer 412, an entropy encoder 414, and an encoder controller 416. The controller 416 manages many aspects of encoding including rate distortion or selection of correct motion partition sizes, correct coding partition size, best choice of prediction reference types, and best selection of modes as well as managing overall bitrate to name a few examples. Thus, while the content metadata unit 314 is shown to provide display control information directly to components of the encoder suggesting those components control how the display content information is used, actually the encoder control 416 may receive the display control information and may be operating those components depending on the display content information by one example.

The output of the quantizer 412 may be provided to a decoding loop 450 provided at the encoder to generate the same reference or reconstructed blocks, frames, or other units as would be generated at the decoder. Thus, the decoding loop 450 may use inverse quantization and inverse transform units 418 and 420 to reconstruct the frames, and residual assembler 422, adder 424, and prediction unit assembler 426 to reconstruct the units used within each frame. The decoding loop 450 then provides filters 428 to increase the quality of the reconstructed images to better match the corresponding original frame. This may include a deblocking filter, a sample adaptive offset (SAO) filter, and a quality restoration (QR) filter. The decoding loop 450 also may have a decoded picture buffer 430 to hold those frames to be used as reference frames for inter-prediction.

The encoder 400 also has a motion estimation module or unit 432 that provides motion vectors as described below, and a motion compensation module 434 that uses the motion vectors to form prediction blocks. The motion estimation unit 432 and motion compensation unit 434 form the inter-prediction capability of the encoder. It will be understood, and as explained in detail below, the motion estimator 432 may use a variety of techniques to form the motion vectors including block matching such as hierarchical motion estimation (HME), spatial dependencies, and zero motion vectors (ZMVs). An intra-frame prediction module 436 provides the intra-prediction capability. Both the motion compensation module 434 and intra-frame prediction module 436 may provide predictions to a prediction mode unit 438.

The prediction mode unit 438 selects the best prediction mode for a particular block. It may compare inter-prediction based predictions of different sub-block arrangements for a single block, an intra-prediction based prediction (which also may include comparing multiple sub-block arrangements), and a skip. The mode selector 438 may have a partition unit 440 to determine when and which sub-block arrangements are to be considered, a mode comparison unit 442 to perform the actual comparisons, and then a mode selector 444 to make the best prediction decision based on the comparison outcomes. The mode selector 438 may receive the display content information including whether a block has or is a skip or a scroll, and then can code that block accordingly without the need to perform inter-prediction block matching at all for that block (or other prediction computation such as intra-prediction). Other details and how the prediction mode unit 438 uses the display content information to reduce the amount of prediction computations is provided below.

As shown in FIG. 4, the prediction output of the selector 438 in the form of a prediction block is then provided both to the subtraction unit 406 to generate a residual, and in the decoding loop to the adder 424 to add the prediction to the residual from the inverse transform to reconstruct a frame. A PU assembler (not shown) may be provided at the output of the prediction mode unit 438 before providing the blocks to the adder 424 and subtractor 406 for HEVC or other standard operation.

More specifically, the video data in the form of frames of pixel data may be provided to the input picture buffer 402. The buffer 402 holds frames in an input video sequence order, and the frames may be retrieved from the buffer in the order in which they need to be coded. For example, backward reference frames are coded before the frame for which they are a reference but are displayed after it. The input picture buffer also may assign frames a classification such as I-frame (intra-coded), P-frame (inter-coded, predicted from a previous reference frames), and B-frame (inter-coded frame which can be bi-directionally predicted from a previous frames, subsequent frames, or both). In each case, an entire frame may be classified the same or may have slices classified differently (thus, an I-frame may include only I slices, P-frame can include I and P slices, and so forth). In I slices, spatial prediction is used, and in one form, only from data in the frame itself. In P slices, temporal (rather than spatial) prediction may be undertaken by estimating motion between frames but also may include spatial dependencies to derive motion vectors. In B slices, and for HEVC, two motion vectors, representing two motion estimates per partition unit (PU) (explained below) may be used for temporal (and spatially dependent MV) prediction or motion estimation. In other words, for example, a B slice may be predicted from slices on frames from either the past, the future, or both relative to the B slice. In addition, motion may be estimated from multiple pictures occurring either in the past or in the future with regard to display order. In various implementations, motion may be estimated at the various coding unit (CU) or PU levels corresponding to the sizes mentioned below. For older standards, macroblocks or other block basis may be the partitioning unit that is used.

Specifically, when an HEVC standard is being used without using the display content information, the prediction partitioner unit 404 may divide the frames into prediction units. This may include using coding units (CU) or large coding units (LCU). For this standard, a current frame may be partitioned for compression by a coding partitioner by division into one or more slices of coding tree blocks (e.g., 64×64 luma samples with corresponding chroma samples). Each coding tree block also may be divided into coding units (CU) in quad-tree split scheme. Further, each leaf CU on the quad-tree may either be split again to 4 CU or divided into partition (or prediction) units (PU) for motion-compensated prediction. In various implementations in accordance with the present disclosure, CUs may have various sizes including, but not limited to 64×64, 32×32, 16×16, and 8×8, while for a 2N×2N CU, the corresponding PUs also may have various sizes including, but not limited to, 2N×2N, 2N×N, N×2N, N×N, 2N×0.5N, 2N×1.5N, 0.5N×2N, and 2.5N×2N. It should be noted, however, that the foregoing are only example CU partition and PU partition shapes and sizes, the present disclosure not being limited to any particular CU partition and PU partition shapes and/or sizes.

As used herein, the term "block" may refer to a CU, or to a PU of video data for HEVC and the like. By some alternatives, this may include considering the block a macroblock or a division of a macroblock of video or pixel data for H.264/AVC, VP8, VP9, and the like, unless defined otherwise.

For one of the alternatives discussed herein, display content information may be provided in a block granularity to the prediction unit partitioner 404 so that the prediction unit partitioner can consider the display metadata block arrangement determined by the content metadata unit 314. Such block granularity may be set at block sizes compatible with the encoder such as CTB 64×64 to smallest sub-division 4×4 blocks. Thus, the prediction unit partitioner 404 may ignore the display metadata block arrangement, may adopt the display metadata block arrangement, or may use it to consider whether certain blocks or coding units of a certain size should or should not be sub-divided further. Thus, for blocks labeled skip or scroll, the prediction unit partitioner 404 may decide that further sub-divisions are unnecessary since these blocks are likely to be coded as is, without further sub-divisions. By another alternative, the content metadata unit 314 may provide a modified optimal block arrangement that the encoder is to use instead of the encoder's own block divisions. The encoder 400 may simply omit its own sub-divisions and wait for the block arrangement from the content metadata unit 314 or determine its own block arrangement anyway and replace it with the block arrangement from the content metadata unit 314.

Due to the structure of this system, it will be understood that such display metadata block partitioning could be performed by the encoder 400 and the prediction unit partitioner 404 itself rather than a separate content metadata unit 314. In this case, the prediction unit partitioner may merely receive the region classifications, and the partitioner 404 may perform any of the alternatives mentioned above including then determining which blocks fall within which region class (skip, scroll, or dirty), and then determining optimal block sub-divisions itself as described in detail below. Many alternatives are contemplated.

Also in video coding system 400, the current video frame divided into LCU, CU, and/or PU units may be provided to both the motion estimation unit or estimator 432 and the prediction mode unit 438. System 400 may process the current frame in the designated units of an image in raster or different scan order such as waveforms. When video coding system 400 is operated in inter-prediction mode, motion estimation unit 432 may generate a motion vector in response to the partition selection by the prediction mode unit 436, the current video frame, and a reference video frame as described below.

A number of different block-based search methods are described herein and may be used to match a block of a current frame with one or more candidate blocks on a reference frame, and thereby determine a motion vector to be encoded for a prediction block. Otherwise, other motion estimation methods to determine a motion vector may be used that reduce the need for block matching at an individual block including the spacial dependency methods, using a ZMV, or even using the motion vector of blocks on a previous frame, and to name a few examples. The motion compensation module 434 then may use the reference video frame and the motion vector provided by motion estimation module 432 to generate the predicted blocks or predicted frame, and provide these predictions to the prediction mode unit 438.

In the partition unit 440 of the prediction mode unit 438, by one example for HEVC, if the size of a CU is 2N×2N, a request is sent to the motion estimation unit to provide MVs for multiple block sub-divisions so that the mode comparison unit 442 can check the Lagrangian cost function of predictions using multiple or exhaustively all modes in a level such as 2N×2N, 2N×N, N×2N, N×N, 3N/4×2N, N/4× 2N, 2N×3N/4, 2N×N/4. By one example, the Lagrangian cost function is determined for each mode by converting bits into a distortion using a Lagrangian multiplier. The Lagrangian cost function may be defined for a mode selection where resultant bits R and a distortion D are determined by a mode for each CU. The best prediction mode of a level is selected based on the minimum value of the cost function. By one example, if any prediction mode except N×N is selected then the selected mode is the final mode for the CU. If N×N is selected in the top level of the coding tree based on the cost function, then N×N/2, N/2×N, N/2×N/2, 3N/4× N, N/4×N, N×3N/4, and N×N/4 modes are checked against the cost function of the N×N mode. If N/2×N/2 mode provides minimum cost function, then the next lower level is also tested. Otherwise, by one example, the final decision is taken in the N/2×N/2 level of the coding tree.

When regional display content information is provided to the prediction mode unit 438, the block being analyzed will be coded according to the classification (when skip or scroll) the block has as explained in detail below. When the block is a skip, the block is coded as a skip and is not sub-divided. When the block is a scroll, the block is coded as inter with no residual, and is not sub-divided either, while the scroll offset for the scroll region (or block) is coded as the MV. In these cases, the partition decision and best mode comparisons by the prediction mode unit 438 may be skipped completely for this block, and the motion estimation unit 432 may not receive instructions to provide an MV for these blocks (or may receive instructions to omit these blocks depending on the default), or the motion estimation unit 432 may compute the motion vectors anyway which simply go unused, although this option is the least efficient.

When display content information is provided in a block granularity, any modifications of the block partitioning due to the display content information is already reflected in the frame partition data provided to the motion estimation unit 432 and prediction mode unit 438. Also in this case, instead of, or in addition to, receiving regional class identification locations, the prediction mode unit 438 may receive block by block class (at least skip or scroll) assignments.

The best predicted block from the prediction mode unit 438 then may be subtracted at subtractor 406 from the current block, and the resulting residual, when present, is provided to the residual coding partitioner 408. Coding partitioner 408 may partition the residual into one or more blocks, and by one form for HEVC, dividing CUs further into transform units (TU) for transform or further compression, and the result may be provided to a transform module 410. The relevant block or unit is transformed into coefficients using variable block size discrete cosine transform (VBS DCT) and/or 4×4 discrete sine transform (DST) to name a few examples. Using the quantization parameter (Qp) set by the controller 416, the quantizer 412 then uses lossy resampling or quantization on the coefficients. The generated set of quantized transform coefficients may be reordered and entropy coded by entropy coding module 214 to generate a portion of a compressed bitstream (for example, a Network Abstraction Layer (NAL) bitstream) provided by video coding system 400. In various implementations, a bitstream provided by video coding system 400 may include entropy-encoded coefficients in addition to side information to be used to decode each block (e.g., prediction modes, quantization parameters, motion vector information, partition information, in-loop filtering information, and so forth), and may be provided to other systems and/or devices for transmission or storage.

The output of the quantization module 412 also may be provided to de-quantization unit 418 and inverse transform module 420 in a decoding loop. De-quantization unit 418 and inverse transform module 420 may implement the inverse of the operations undertaken by transform unit 410 and quantization module 412. A residual assembler unit 422 may then reconstruct the residual CUs from the TUs. The output of the residual assembler unit 422 then may be combined at adder 424 with the predicted frame to generate a rough reconstructed block. A prediction unit (LCU) assembler 426 then reconstructs the LCUs from the CUs to complete the frame reconstruction.

The reconstructed frames are filtered, and then provided to a decoded picture buffer 430 where the frames may be used as reference frames to construct corresponding predictions for motion estimation and compensation as explained herein. When video coding system 400 is operated in intra-prediction mode, intra-frame prediction module 436 may use the reconstructed pixels of the current frame to undertake intra-prediction schemes that will not to be described in greater detail herein.

Figure 2:
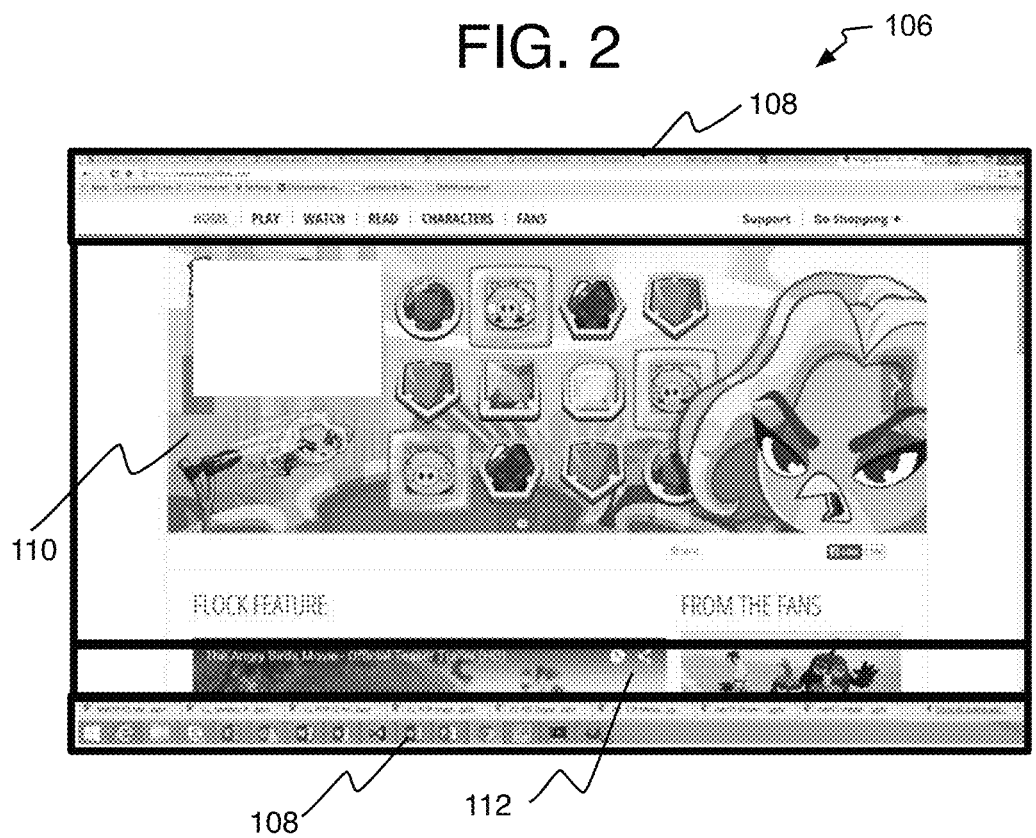
FIG. 2 is another schematic diagram to explain multiple display buffers.

In some examples, video coding system 400 may include additional items that have not been shown in FIG. 2 for the sake of clarity. For example, video coding system 400 may include a processor, a radio frequency-type (RF) transceiver, splitter and/or multiplexor, a display, and/or an antenna. Further, video coding system 400 may include additional items such as a speaker, a microphone, an accelerometer, memory, a router, network interface logic, and so forth. Some of these components are shown on other implementations described herein.

Figure 5:
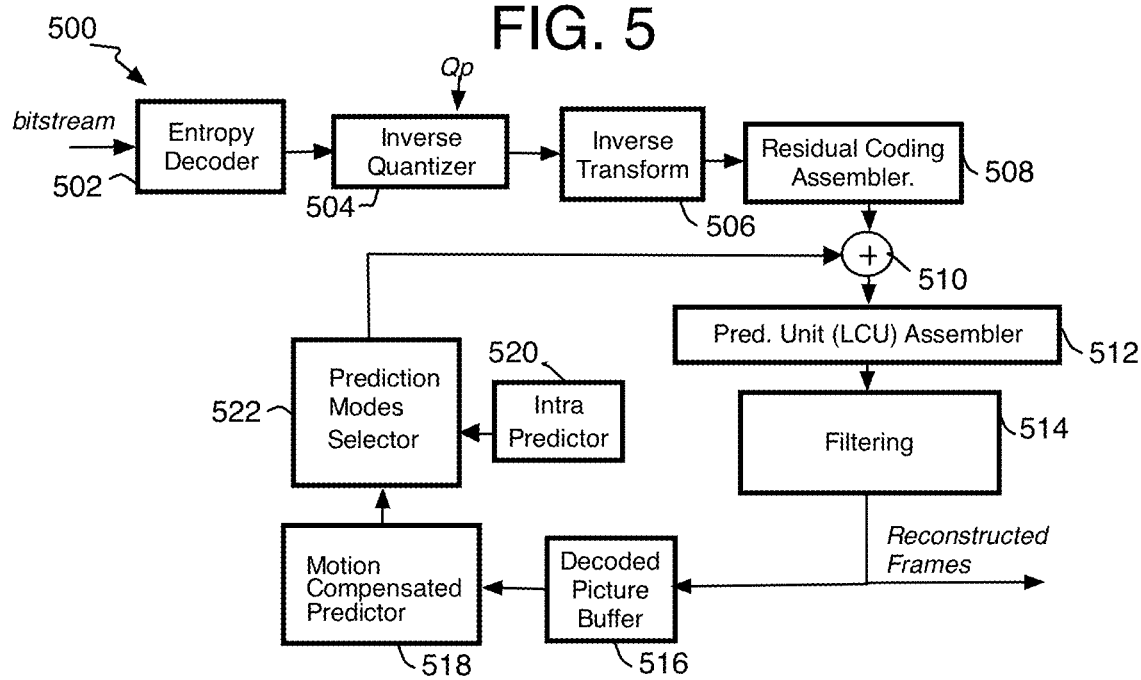
FIG. 5 is a schematic diagram of a decoder for a video coding system.

Referring to FIG. 5, a system 500 may have, or may be, a decoder, and may receive coded video data in the form of a bitstream and that has residuals, motion vectors, block partitions, and prediction modes for individual blocks that are established by the use of the display content information at the encoder. The system 500 may process the bitstream with an entropy decoding module 502 to extract quantized residual coefficients as well as the motion vectors, prediction modes, partitions, quantization parameters, filter information, and so forth. The system 500 then may use an inverse quantizer module 504 and inverse transform module 506 to reconstruct the residual pixel data. The system 500 then may use a residual coding assembler 508, an adder 510 to add the residual to the predicted block, and a prediction unit (LCU) assembler 512. The system 500 also may decode the resulting data using a decoding loop employed depending on the coding mode indicated in syntax of the bitstream and implemented via prediction mode switch or selector 522, and either a first path including an intra prediction module 520 or a second path that is an inter-prediction decoding path including one or more filters 514. The second path may have a decoded picture buffer 516 to store the reconstructed and filtered frames for use as reference frames as well as to send off the reconstructed frames for display or storage for later viewing or another application or device. A motion compensated predictor 518 utilizes reconstructed frames from the decoded picture buffer 516 as well as motion vectors from the bitstream to reconstruct a predicted block. Thus, the decoder does not need its own motion estimation unit since the motion vectors are already provided, although it still may have one. A prediction modes selector 522 sets the correct mode for each block, and a PU assembler (not shown) may be provided at the output of the selector 522 before the blocks are provided to the adder 510. The functionality of modules described herein for systems 400 and 500, except for the units related to the display content information such as the content metadata unit 314, and aspects of the selector 438 for example and described in detail below, are well recognized in the art and will not be described in any greater detail herein.

Referring now to FIG. 6, an example process 600 is arranged in accordance with at least some implementations of the present disclosure. In general, process 600 may provide a computer-implemented method of video coding using content based metadata or display content information as mentioned above. In the illustrated implementation, process 600 may include one or more operations, functions or actions as illustrated by one or more of operations 602 to 606 numbered evenly. By way of non-limiting example, process 600 may be described herein with reference to operations discussed with respect to FIGS. 3-5 and 13 herein and may be discussed with regard to example systems 300, 400, 500, or 1300 discussed below.

The process 600 also may comprise "obtain temporal display content information of image data of frames of a frame sequence and related to the comparison of at least two frames of the frame sequence and to be used to render the frames" 602. As mentioned above, when displaying images of a frame sequence on an on-board or wired display, the system, or by one example the operating system (OS), may detect static (clean), scrolled, and dirty areas of an image where the static area remains the same from frame to frame (whether consecutive or some other interval), while the scroll area is where the content (color and luminance) of the image remains the same but is moved, and has an offset that can be treated as a motion vector, also to save time and reduce computations while rendering the images on the display. This temporal display content information is obtained by the encoder, and may be received in region form, where image regions with one of the three (or other) classifications are defined such as by pixel location. Otherwise, the display content information may be obtained in a block granularity where either the encoder or a processing unit external to the encoder has already divided a frame into blocks and classified the blocks with one of the classifications. For example, the blocks may be any size from 64×64 to 4×4 or other sizes as compatible with the coding standard being used, or may be a combination of the blocks when already provided in CTB sub-divisions as described below.

The process 600 may comprise "obtain pixel image data of the frames to encode the frame sequence" 604, and particularly obtained by the same encoder that obtained the content information. By one example, the encoder may process images using HEVC or other standards that use the pixel image data (such as the chroma or luminance or both values of the pixels to be used to form the image) to divide the frames into blocks and sub-divisions of the blocks as described above.

To perform the selection of the best prediction mode for a current block, the process 600 may include "determine a prediction mode of at least one portion of at least one frame of the frame sequence to be used to encode the pixel image data of the at least one portion and based on, at least in part, the temporal display content information" 606. Specifically, and described in detail below, the blocks in the static region as defined by the temporal display content information may be received coded as skip (or zero motion vector (ZMV)) and is not further sub-divided, or at least the sub-divisions are not compared for best prediction mode. A scroll block also is not sub-divided and while being coded as inter-prediction the scroll offset is set as the MV for any block in the scroll region. No residual is coded for the scroll blocks. Dirty blocks are coded as with any other usual block. By omitting the motion estimation and motion compensation for the skip and scroll areas indicated by the temporal display content information, a substantial amount of computation is eliminated and memory bandwidth is reduced.

By other approaches, the system, or the operating system or the content metadata unit, may provide block-granularity display content information such as the three classes mentioned above. The block level display content data can then be used to determine the CTB sub-divisions thereby increasing accuracy and efficiency. By one alternative, the content metadata unit may provide display metadata-based block sub-division arrangements that optimize the arrangement, by one example, by providing the largest possible blocks or sub-divisions versus the encoder which may provide smaller partitions. When the prediction mode unit compares block predictions with predictions from sub-division of the block, the larger blocks are more efficient since that will result in less comparisons. The encoder uses this optimized display metadata-based block arrangement based on the display content information rather than the usual encoder initiated partitioning. The details are explained below.

Figure 7:
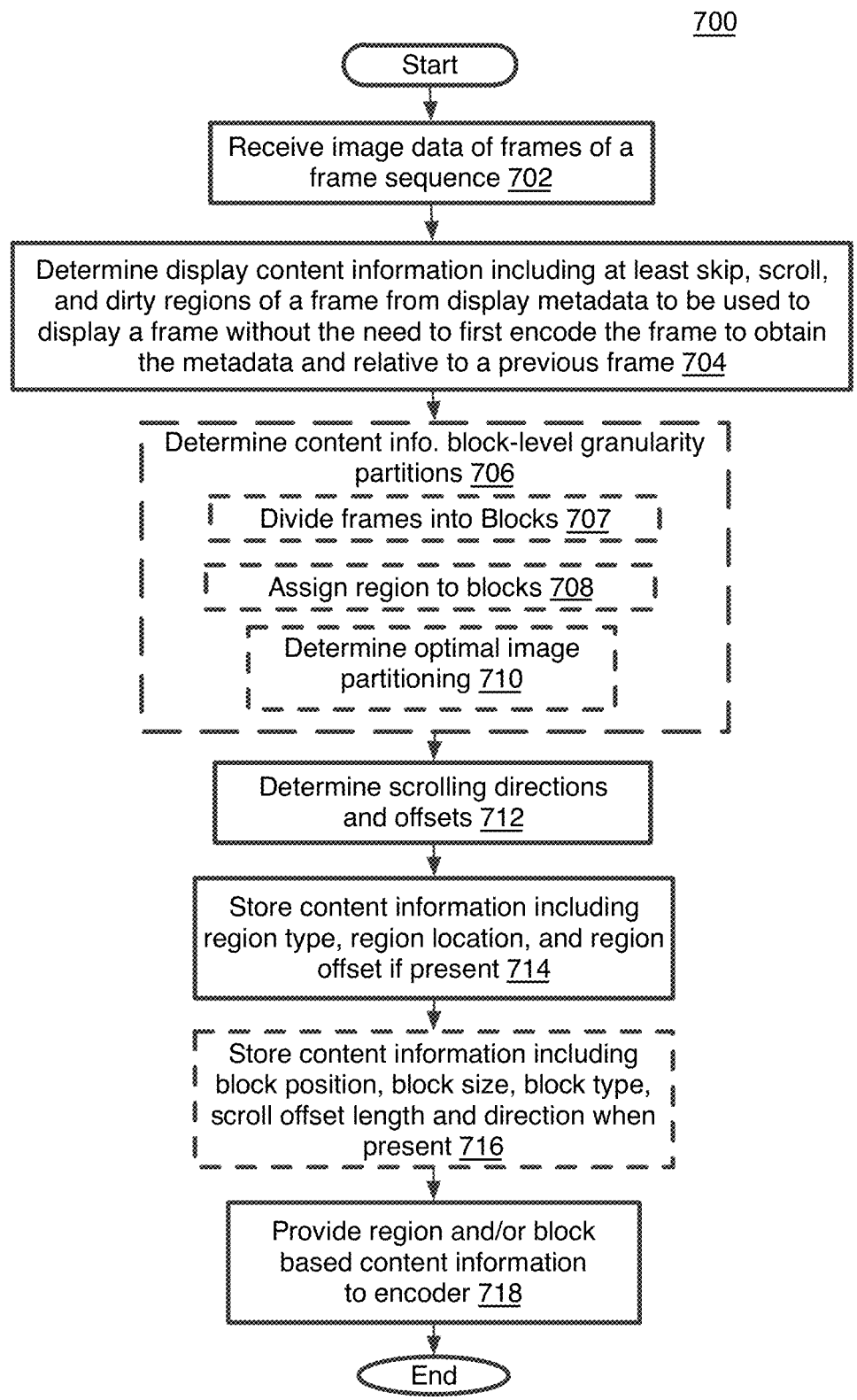
FIG. 7 is a detailed flow chart of a method of video coding using display-related metadata according to the implementations herein.

Referring now to FIG. 7, an example process 700 is arranged in accordance with at least some implementations of the present disclosure. In general, process 700 may provide a computer-implemented method of video coding using content based metadata or display content information, and particularly, to a method related to obtaining the metadata forming the display content information in the first place and placing it in a form to be provided to an encoder. In the illustrated implementation, process 700 may include one or more operations, functions or actions as illustrated by one or more of operations 702 to 716 generally numbered evenly. By way of non-limiting example, process 700 may be described herein with reference to operations discussed with respect to FIGS. 3-5 and 13 herein and may be discussed with regard to example systems 300, 400, 500, or 1300 discussed below.

Process 700 may include "receive image data of frames of a frame sequence" 702, and particularly, a system or device may have a camera to record a video in the first place, perform pre-processing sufficient for immediate viewing of the video and then store the video frames at least on volatile memory (RAM) to be fetched for viewing. Otherwise, the video may have been placed in non-volatile memory to be viewed when desired. A frame sequence may include content to be displayed on a computing device for many different applications (web browser, word processor, spread sheets, and so forth) and may be anything visual that can be displayed on a display in the form of a frame sequence and is not particularly limited. The displaying of the frame sequence may include pre-processing sufficient to view the video or frames such as de-mosaicing, de-noising, and so forth. The frame sequence also may be stored where it is accessible to an encoder on or communicating with the device.

Process 700 may include "determine display content information including at least skip, scroll, and dirty regions of a frame from display metadata to be used to display a frame without the need to first encode the frame to obtain the metadata and relative to a previous frame" 704. Thus, while the video is being played on the device, or sufficient processing has occurred so that the video can be played on the device, metadata of the image data of individual frames can be obtained and that defines different regions on the frame by comparing at least two frames (a current frame and at least one reference frame) and noting the similarities and differences in the image content including the chroma and luminance data of individual pixels of the frame and the location of that content in those frames. By one example, individual current frames are each compared to a consecutive previous frame, but many other variations could be used such as some interval of frames, or only selection of frames of a certain type, like those most likely to be a P (prediction) frame for the encoder, and so forth. As noted above, Windows DirectX is one possible example OS, and related components, that has this capability.

By one example approach, the pixel locations of the current frame and reference frame is compared in raster direction. Pixel locations that do not change significantly from frame to frame or are otherwise found to be the same are considered static regions and labeled as static, clean, or skip. These skip blocks can be coded without a residual and need not be sub-divided into further sub-division prediction blocks. Pixels location found to have the same content but moved to a different pixel location are noted as scroll locations or regions. A scroll region has the same chroma and luminance content only shifted in a horizontal or vertical (or both) directions on the screen forming the frame. The distance or offset from one location on one frame to another location on the other frame as well as the horizontal and/or vertical direction is noted as well. The system, and particularly the OS, determines the offsets from the image data in the front and back buffers as explained above, and provides the offsets through an application program interface (API) so that the video driver can use the offsets. These are to be coded as inter-prediction blocks without a residual, and the offset of the scroll is coded as the motion vector. Pixel locations with different content not found in the previous frame are labeled as dirty. A single region may be formed for each region class (skip, scroll, dirty, and/or others) and may be one contiguous area but could also be scattered throughout a frame. Thus, a region could be formed of a number of separated areas. Many variations are possible. Dirty regions are to be coded as any other block in the encoder that does not have the benefit of the display content information.

The result is content metadata of a frame indicating display content information of defined regions of static (clean) region, scroll region, and/or a dirty region that includes the size and location of each region. This could be limited to rectangular regions with four corners provided for each region. In this case, the system may determine the largest possible area on the frame (regardless of any block definitions for now) that all have pixels with the same classification. Otherwise, a region rectangle may be established that has some percentage of the same region class, such as 90% scroll for example. By another alternative, more sophisticated listings providing the pixel location for each bend in a region border may be established. Many variations are possible.

By one alternative, the process 700 may include "determine content information block-level granularity partitions" 706. This may first include "divide frames into blocks" 707. Thus, a frame may be divided into blocks of a uniform size, and by one form, a size that is compatible with the encoder. Thus, for HEVC, the blocks may be 64×64 to 4×4 sub-division blocks and may be determined by heuristics to decide which size is usually most efficient. These block region assignments then may be used by the encoder to determine the CTB sub-divisions as explained below.

This operation also may include "assign region to block" 708. Here, the system may compare the location of each block with the location of the regions and assign the block the region class where it is located. By one form, when a larger block (such as a 64×64 block) has any dirty block sub-division (such as a 4×4 dirty block), then the larger block also is considered dirty, which increases the number of dirty blocks for a frame for higher accuracy versus speed and reduced memory bandwidth.

By another alternative, the process 700 may include "determine optimal image partitioning" 710. Here, the system may assign region classes to small sub-divisions, such as 4×4 blocks, and then aggregate those blocks to determine the largest blocks with like regions as long as the resulting block is a size of CTB division recognized by the encoder such as 4×8 or 8×4 and so forth up to the 64×64 LCU. These block divisions then may be used by the encoder instead of the encoder determined, or determining, the block sub-divisions without using the display content information. The block sizes here will increase the efficiency and speed of the encoding. Also, sub-dividing blocks based on the metadata may include following certain video hardware (HW) encoder constraints (or preferences). This may include minimum/maximum block size constraints and rate control constraints.

The process 700 may include "determine scrolling directions and offsets" 712, and by this, the region offsets determined by the OS are assigned to each block, when present, as a motion vector for that block that may be coded as a motion vector. Both the distance and direction (in positive or negative value) of the offset (or motion vector) for the block may be provided to the encoder.

The process 700 may include "store content information including region type and position" 714. The region location for each region class may be stored in memory, such as RAM, and described as above. The regions are then provided to the encoder alone unless blocks are defined as well.

When blocks are defined, the process 700 may include "store content information including block position, block size, block type, scroll offset length and direction when present" 716, and store the data in Ram for example, or other memory, where it is accessible by the encoder, and in such a way as to indicate the region classes whether only be region or by block location. Flow 1100 (FIG. 11) shows one example per block metadata that may be stored and is discussed in detail below.

The process 700 may include "provide region and/or block based content information to encoder" 718. Thus, the system may provide the encoder the region based classes or may provide blocks classified into the regions from the content metadata unit for example, and the encoder is arranged to use the region or block display content information as is. Alternatively, the encoder may receive the regional content information and may perform the block partitioning itself to assign blocks to specific region classifications. For example, the encoder may perform the aggregation to derive modified or optimal block sub-division arrangements, and so forth.

By one form, the system provides the metadata to the encoder only when the encoder queries the OS for the metadata. By other examples, the OS continuously transmits the metadata to the encoder without such a query. By one example, a video driver (or display engine) may request the display information from the OS, and the OS then creates the content metadata.

Figure 8:
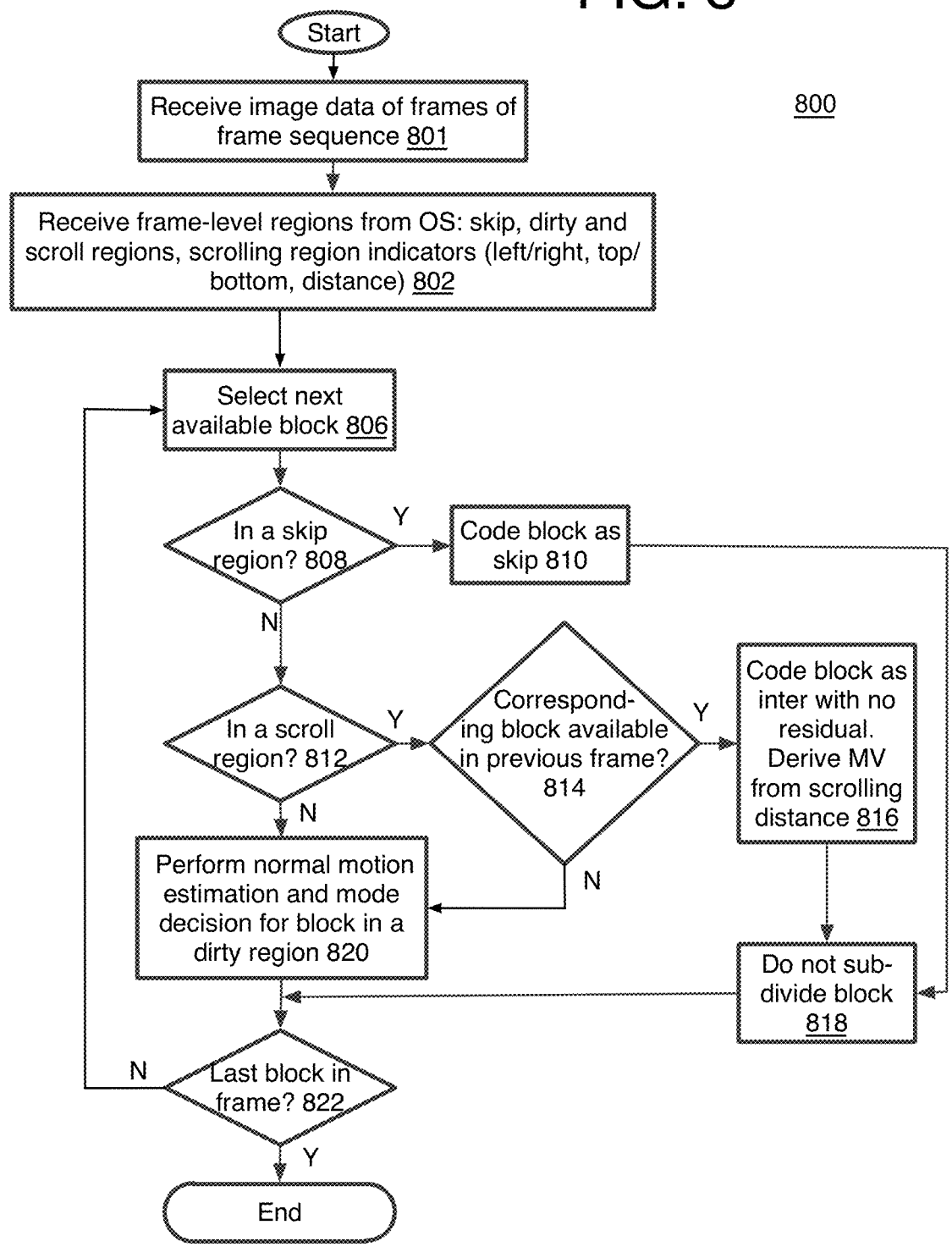
FIG. 8 is another flow chart of a method of video coding using display-related metadata according to the implementations herein.

Referring now to FIG. 8, an example method 800 of video coding using content based metadata or display content information is provided. In the illustrated implementation, process 800 may include one or more operations, functions, or actions as illustrated by one or more of actions 802 to 822 generally numbered evenly, and used alternatively or in any combination. By way of non-limiting example, process 800 may be described herein with reference to operations discussed with respect to any of the implementations described herein.

Process 800 may include "receive image data of frames of a frame sequence" 801, which may merely refer to having the metadata in a memory and accessible to the encoder. As mentioned, it may be formed based on a query from the encoder or display engine, or could be formed continuously without such a query.

Process 800 may include "receive frame-level regions from OS: skip, dirty, and scroll regions, scrolling region indicators (left/right, top/bottom, distance)" 802. Thus, process 800 is directed to the arrangement where only region based display content information classifications are provided to the encoder without block level granularity. Also as mentioned, while a region may be a rectangular space, it may be other unusual shapes with precisely defined outer boundaries, or could include locations scattered on a frame but having the same display content region class (skip, scroll, or dirty for example).

Process operation number "804" is skipped in process 800 so that operations 806 onward that are similar in operation in processes 800, 900, and 1000 to those operations here have similar numbering.

Process 800 may include "select next available block" 806. This refers to the encoder's prediction unit partitioning into CTB sub-division blocks. Once the encoder has its sub-division blocks, and the blocks are being processed as described above so that reference frames are already decided for example, the prediction mode unit may use determine the region class for each block that is provided to it for prediction mode selection and coding. The order of the blocks for prediction mode selection is provided as known for such encoders.

Accordingly, once a block is selected, process 800 may include a query "in a skip region?" 808, and the block location is compared to the pixel or other coordinates of the skip region.

If the block is within the skip region, process 800 may include "code block as skip" 810. Also, this informs the prediction mode unit that no further sub-divisions of the block are needed 818 to compare predictions of different sub-divisions to each other and the block form which they came from to determine a best prediction mode among them. Thus, the prediction mode unit will not request the motion vectors and in turn the subdivision predictions from the motion estimation unit and these sub-division computations are omitted thereby eliminating a large computational load. By other approaches, the motion estimation unit may provide motion vectors, and the motion compensation unit may form predictions for the sub-divisions, except that here these will simply be dropped due to non-use by the prediction mode unit.

Thereafter, when the last block has been processed, the process has ended for the frame, but if not (operation 822), the process 800 loops back to obtain the next block at operation 806.

When the block is not found in a skip region, process 800 may include a query "in a scroll region?" 812. If the block is in a scroll region, a query determines whether the same block (the same image content such as the color and luminance data) is found in a reference frame, and one example the previous frame (814). If found, the block is a scroll block, and is coded as inter (inter-prediction) with no residual (816). Omitting the residual reduces the bitrate in the encoded bitstream and reduces complexity. By one alternative, the prediction and resulting residual can be computed anyway to increase accuracy.

Also at operation 816, the MV of the block is derived from the scroll offset (same distance and direction) applied to the location of the current block. In most instances, this will be a horizontal or vertical scrolling but could be some combination direction if the system is arranged to accommodate that (is arranged to handle an x and y components of a single offset). If there is both a horizontal and vertical offset (a diagonal offset), the system may not be able to handle it, or may choose not to, and codes these blocks as dirty. The sub-division of the scroll blocks are also omitted (818) to save computational load as with the skipped region blocks.

When a block is neither the skip region nor the scroll region, the block is a dirty block with new image data not found on the previous frame. In this case, process 800 may include "perform normal motion estimation and mode decision for block in dirty region" 820.

Upon the completion of the region classification and coding of each block as mentioned, the process 800 may include "last block in frame?" 822 and return to operation 806 for the next block as mentioned, or end when the last block is reached.

By yet another alternative, instead of automatically using the display content information-based block coding, a prediction may be formed for the block (when that makes sense) and cost (such as bit cost for forming and coding the prediction, residual, and transform blocks) may be determined to use the block and its prediction as a candidate prediction to be compared to other predictions for the block. Thus, a block found to be a skip still may be compared to inter and intra coding-based predictions found without using the display content information.

Figure 9:
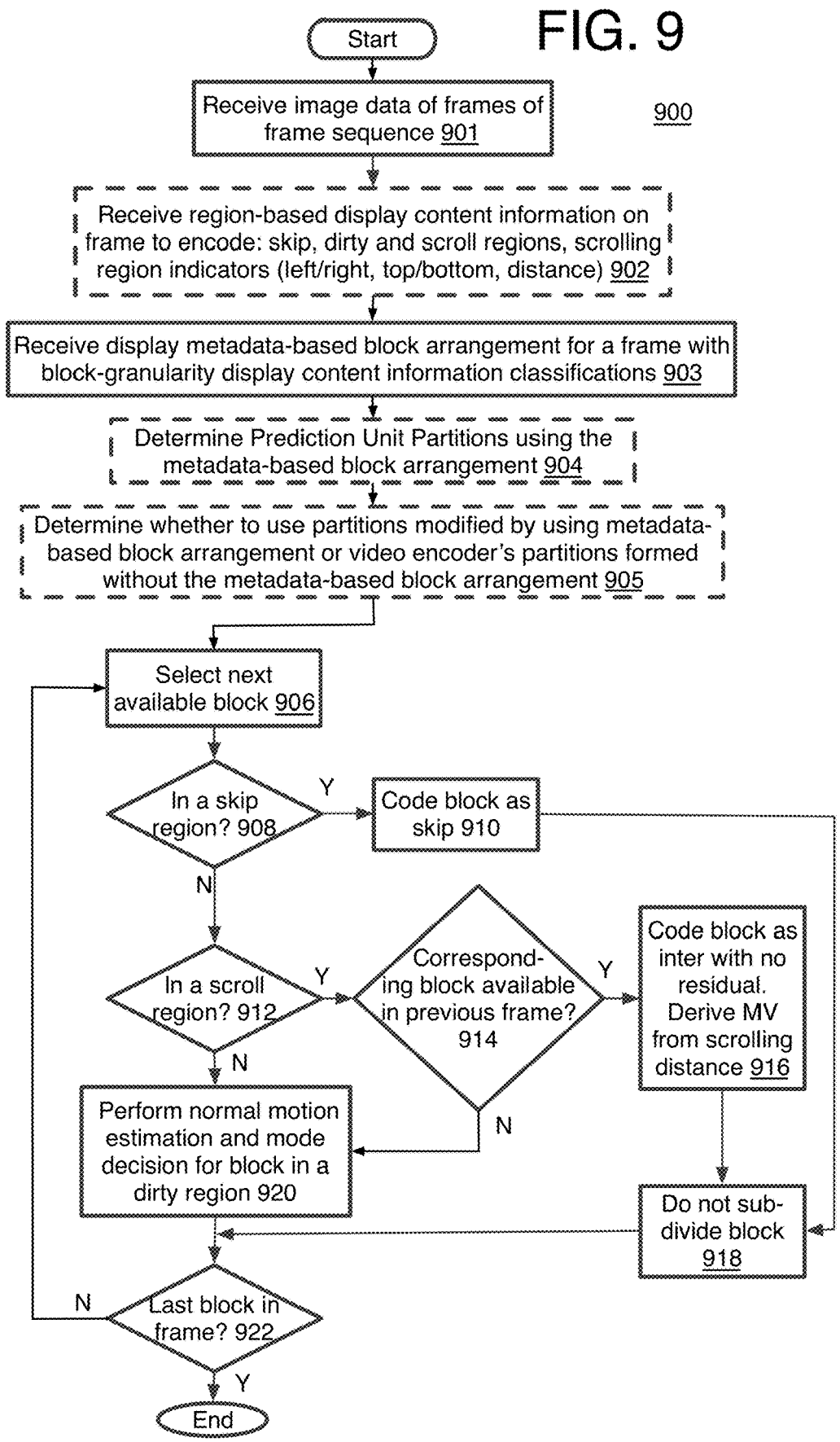
FIG. 9 is a flow of an alternative method of video coding using display-related metadata according to the implementations herein.

Referring now to FIG. 9, an example method 900 of video coding using content based metadata (or display content information) is provided. In the illustrated implementation, process 900 may include one or more operations, functions, or actions as illustrated by one or more of actions 902 to 922 generally numbered evenly, and used alternatively or in any combination. By way of non-limiting example, process 900 may be described herein with reference to operations discussed with respect to any of the implementations described herein.

Process 900 may include "receive image data of frames of a frame sequence" 901, and as already described above with operation 801 of process 800, where image data of a video or frame sequence is provided to display the sequence on a display and also is provided to be encoded and transmitted to a device with a decoder and a display by one example.

Process 900 may include "receive region-based display content information on frame to encode: skip, dirty, and scrolling region indicators (left/right, top/bottom, distance)" 902, and as described above with operation 802. It will be understood that region classifications other than or in addition to skip, dirty, and scrolling may be used or any combination of them, and by one form, as long as the region classes indicate the change or similarity of image data between at least two frames of a video sequence. It will be understood that for process 900 such region locations of the region classes may be optional since the region classes are to be provided on a block granularity anyway. Thus, the region locations indicated as an entire region may be provided in addition to block region class assignments but would not typically be provided alone for this option.

Accordingly, process 900 may include "receive display metadata-based block arrangement for a frame with block-granularity display content information classifications" 903. Thus, as explained above with process 700, the frame may have been divided into blocks with sizes compatible with the coding standard being used by the encoder, such as 64×64 to 4×4 PU sub-divisions for HEVC. While these two sizes are usually mentioned herein, the blocks could be a number of different sizes such as 32×32, 16×16 macroblocks, 8×8 coding unit size, and so forth. Also, each block may be listed in memory with its block size and block location, and already may be assigned a region class (skip, scroll, or dirty), and if scroll, may have an associated offset distance and direction (see flow 1100 with FIG. 11 below). This block data may be provided, or made accessible to, the encoder as with the entire region-based data as mentioned above, whether streaming the data to the encoder, and whether on an automatic basis or by query from the encoder.

Also as mentioned, while in one form dividing the frames into the metadata blocks as well as assignment of the region class to those blocks may be performed by a content metadata unit considered external to the encoder, these operations may be considered to be entirely or partially performed by the encoder as well.

By one alternative approach then, process 900 may include "determine prediction unit partitions using the metadata-based block arrangement" 904. Thus, when the metadata-based block arrangement is provided to the prediction unit partitioner of an encoder, the metadata-based block arrangement may be considered when determining the sub-divisions of a block. This may be implemented in a number of different ways. By one example, the metadata-based block arrangement is always considered when present and is used to subdivide or otherwise decide block sizes and overrides the encoder partitions formed without the assistance of the metadata-based block arrangement if so formed. By other examples, the metadata-based block arrangement is considered and used only under certain circumstances. Thus, by one example, it is only used when the metadata-based blocks are smaller than the CTB blocks, and therefore, the encoder, and particularly the prediction unit partitioner, decides whether to sub-divide a current block to the metadata-based size.

Also as mentioned above, the prediction mode unit also may use these metadata-based blocks to determine whether those sub-divisions should be considered for separate prediction comparison to the prediction of other sub-divisions, and predictions of other prediction modes (such as intra, and/or skip for example) for dirty blocks for example. As mentioned, in the conventional methods, once a certain block size is obtained, the block may have a fixed set of its sub-divisions with particular sub-division sizes each tested as a separate prediction candidate. Some of these sub-divisions when available are based on the metadata-based sub-division blocks.

Process 900 may include "determine whether to use partitions modified by using metadata-based block arrangement or video encoder's partitions formed without the metadata block arrangement" 905. Thus, in the case where both sets of blocks are available, the encoder may decide which set to proceed with and very well may decide to use the encoder's partition arrangement rather than the metadata-based block arrangement because of internal hardware constraints or better coding efficiency.

Once it is determined which blocks are to be used going forward, operations 906 to 922 of process 900 are the same or similar as operations 806 to 822 described above for process 800 and are adequately described with process 800 for the operations 906 to 922 performed here. Except here, the region assignment class of a block may already be provided in memory on a block granularity basis rather than just the entire region location. Otherwise, the blocks are coded similarly.

Figure 10:
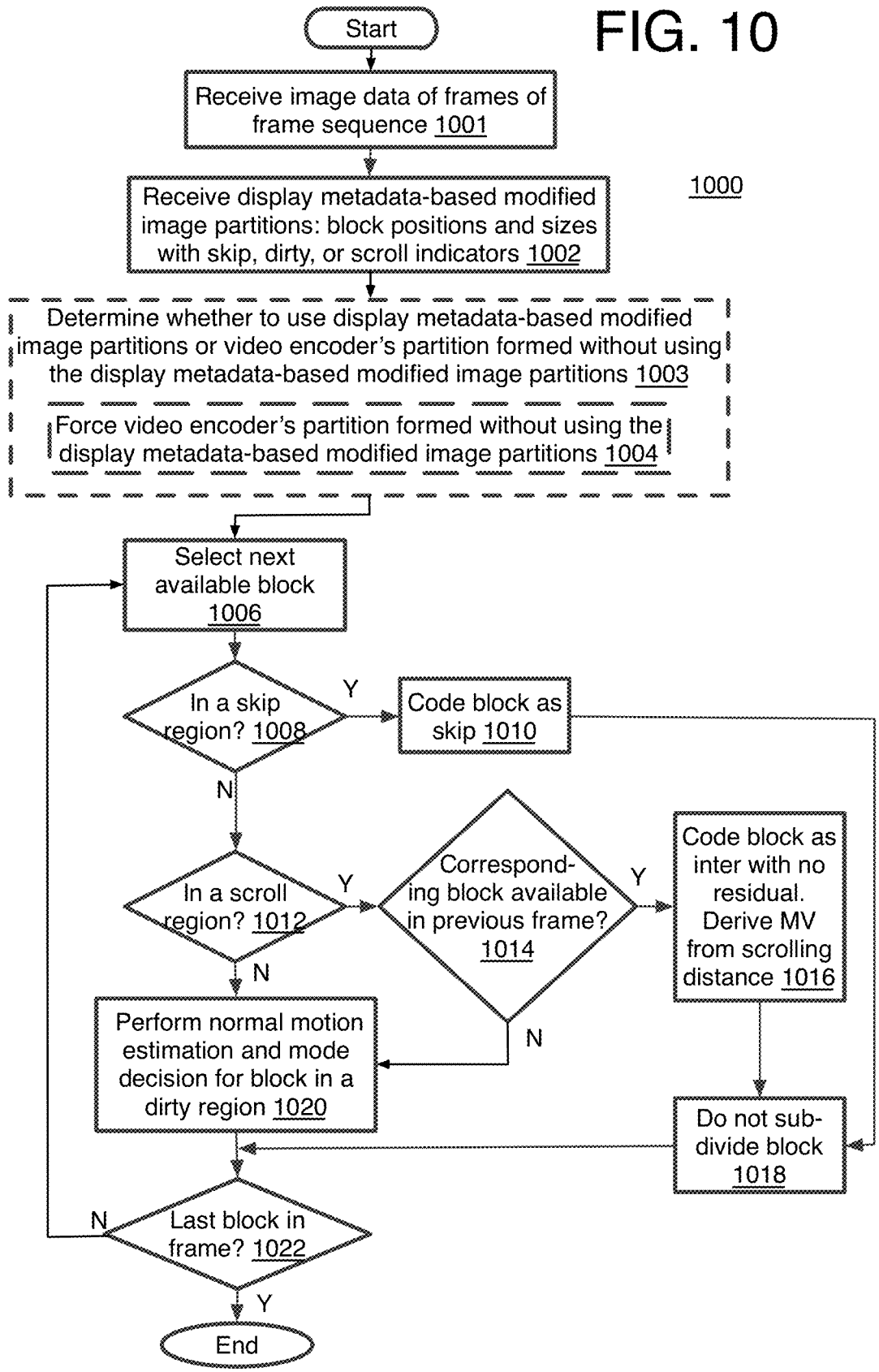
FIG. 10 is a flow chart of another alternative method of video coding using display-related metadata according to the implementations herein.

Referring now to FIG. 10, an example method 1000 of video coding using content based metadata (or display content information) is provided. In the illustrated implementation, process 1000 may include one or more operations, functions, or actions as illustrated by one or more of actions 1002 to 822 generally numbered evenly, and used alternatively or in any combination. By way of non-limiting example, process 800 may be described herein with reference to operations discussed with respect to any of the implementations described herein.

Process 1000 may include "receive image data of frames of a frame sequence" 1001, and as already explained above for processes 800 and 900.

Process 1000 may include "receive display metadata-based modified image partitions: block positions and sizes with skip, dirty, or scroll indicators" 1002. For this alternative, the blocks already have been modified for efficiency based on the metadata. Thus, the sub-division block sizes have been aggregated to larger sizes where possible to reduce the number of sub-divisions that are to be used as predictions as described above. In case, the prediction mode unit uses these modified partitions for comparing predictions for inter-prediction when it occurs including for dirty blocks.

Process 1000 may include "determine whether to use display metadata-based modified image partitions or video encoder's partitions formed without using the display metadata-based modified image partitions" 1003. Thus, the modified image partitions may be used as the prediction unit partitioning, and in this case, overrides any partitioning of the encoder formed without such modified block partitioning. By one form, this may be based on some criteria, such as the percentage of a frame that is scroll and skip rather than dirty blocks for example. Other criteria could be the number of regions, their spatial position and sizes, and so forth.

Thus, one possible option is to have process 1000 include "force video encoder's partition formed without using the display metadata-based modified image partitions" 1004. In this case, even when the metadata-based modified block partitions are provided, they are not used, and the encoder's non-metadata-based blocks are used instead for the reasons mentioned in operation 1003, or otherwise when an encoder is not arranged to recognize such data.

Once is set as to which block partitioning is to be used going forward, operations 1006 to 1022 of process 1000 are the same or similar as operations 806 to 822 described above for process 800 and are adequately described with process 800 for the operations 1006 to 1022 performed here without repeating the whole operations. It is noted that upon determining whether a block is in a region, a prediction mode unit may receive the region assignments on a block by block basis rather than the region size and position of an entire region.

Figure 11:
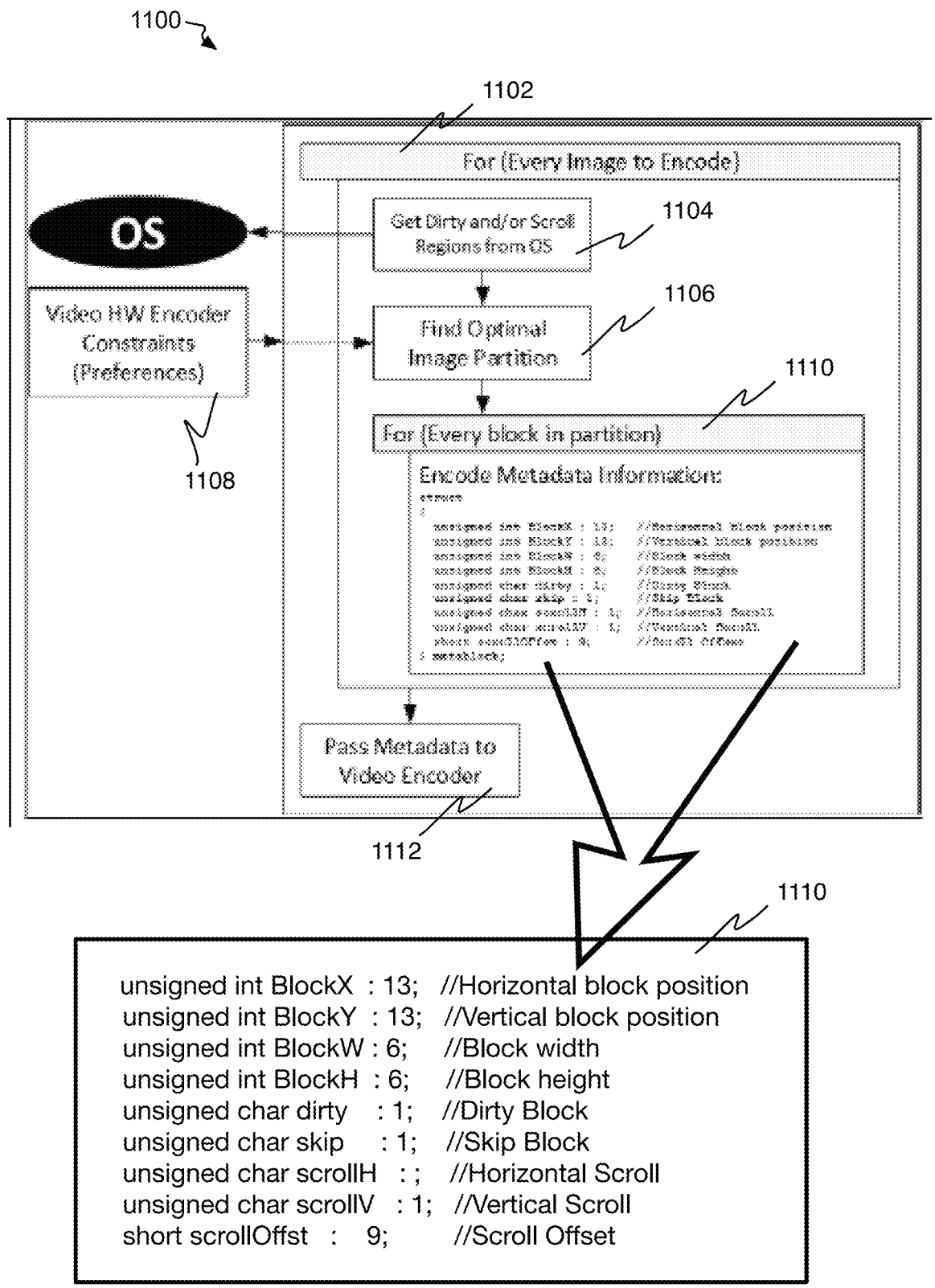
FIG. 11 is a simplified schematic to show the basic flow and form of metadata provided to an encoder for a method of video coding using display-related metadata according to the implementations herein.

Referring to FIG. 11, a simplified process is used to explain one example form of the metadata provided to the encoder when modified or optimal block partitioning is performed by the metadata video unit or the encoder. For example, an operation for every image to encode 1102 is shown and includes an operation "Get dirty and/or scroll regions from OS" 1104, and as mentioned above to obtain the region classes and their locations on an image, and may be performed by the OS. Then "find optimal image partition" 1106 is performed, and may be determined while complying with video hardware (HW) encoder constraints (preferences) 1108 as already described above. Then an operation "Find optimal image partition" 1110, shows an example set of data that is provided for each block, where unsigned refers to the sign (+/−) of the value, int is integer value, char refers to a 64 bit value, and the bit size is provided next to the code for the parameter where block location component has 13 bits available, block size has 6 bits available, and dirty, scroll, and scroll direction has yes/no single bit, and where the scroll offset has 9 bits available. This data may add 8 bytes per block but could be as small as 2 bytes when an existing encoder partition is used so that an additional block address is not needed.

Finally, such a method may include "Pass metadata to video encoder" 1112, also as already described.

Figure 12:
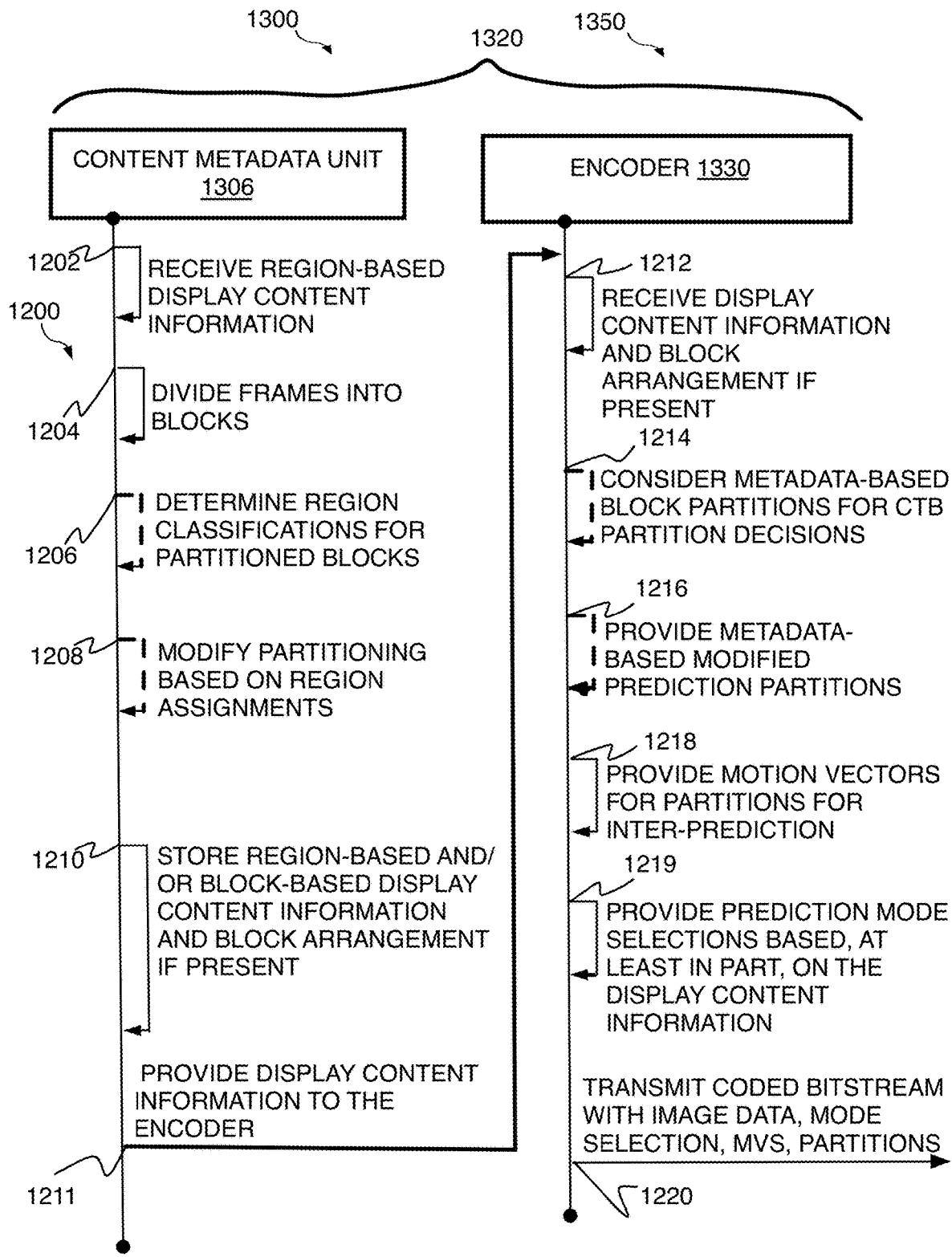
FIG. 12 is an illustrative diagram of an example system in operation for providing a method of video coding using display-related metadata according to the implementations herein.

Referring now to FIG. 12, a system 1300 is shown in operation of an example method 1200 of video coding using display-related metadata or display content information is provided. In the illustrated implementation, process 1200 may include one or more operations, functions, or actions as illustrated by one or more of actions 1202 to 1222 generally numbered evenly, and used alternatively or in any combination. By way of non-limiting example, process 1200 may be described herein with reference to operations discussed with respect to any of the implementations described herein.

Figure 13:
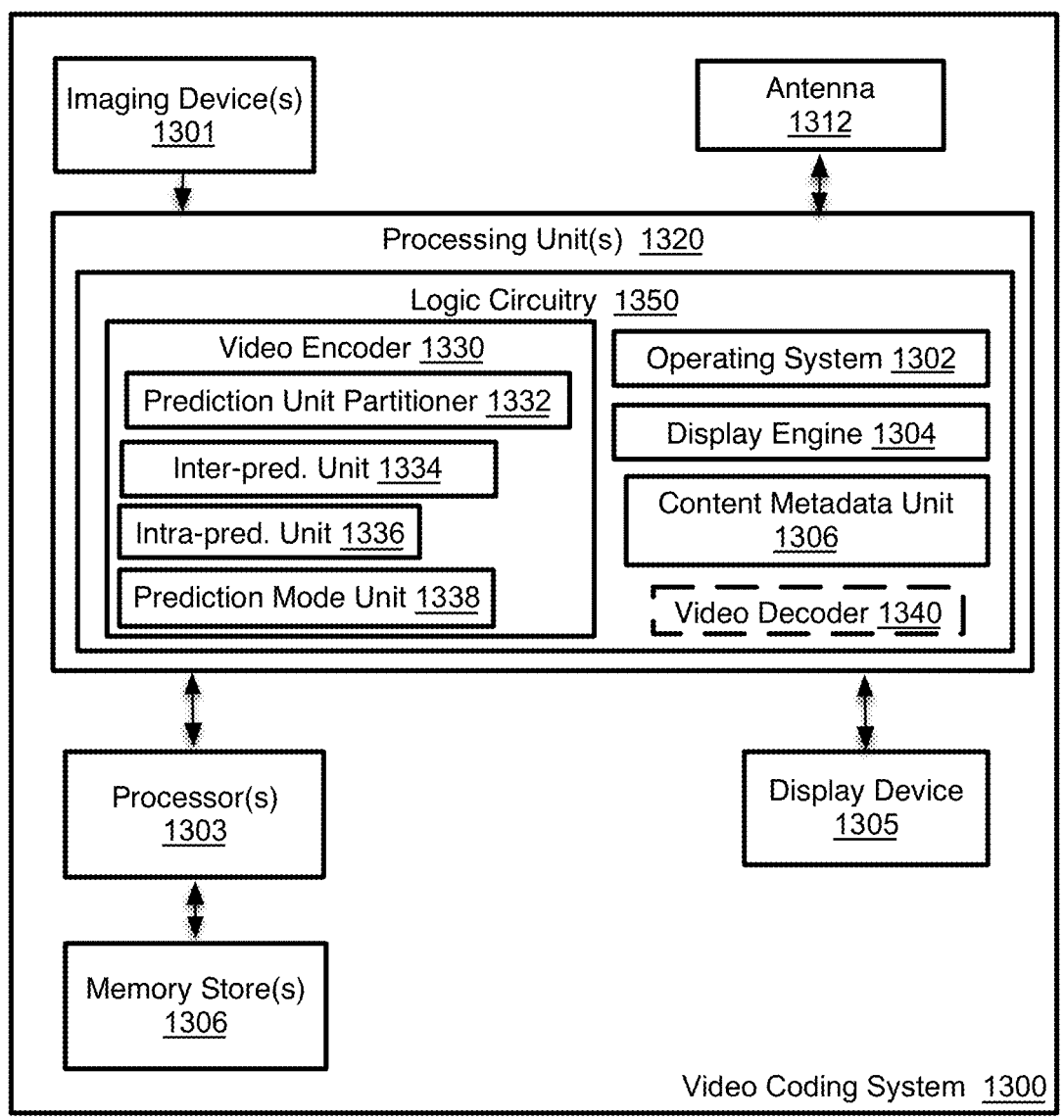
FIG. 13 is an illustrative diagram of an example system.

In the illustrated implementation, system 1300 may include a processing unit 1320 with logic units or logic circuitry or modules 1350, the like, and/or combinations thereof. For one example, logic circuitry or modules 1350 may include the operating system 1302, display engine 1304, and content metadata unit 1316 as described above to provide display content information, and a video encoder 1330 with relevant components including a prediction unit partitioner 1332, an inter-prediction unit 1334, an intra-prediction unit 1336, and a prediction mode unit 1338 using the display content information to determine prediction modes and/or block partitions as described herein. Although system 1300, as shown in FIG. 13, may include one particular set of operations or actions associated with particular modules, these operations or actions may be associated with different modules than the particular module illustrated here.

Process 1200 may include "receive region-based display content information" 1202, where the system, or specifically the prediction mode units at the encoder, may obtain access to pixel data of both the current blocks of a frame to be encoded and reconstructed frames to be used as reference frames. The data may be obtained or read from RAM or ROM, or from another permanent or temporary memory, as described on systems 1300 or 1400, or otherwise from an image capture device. The access may be continuous access for analysis of an ongoing video stream for example.

Process 1200 may include "divide frames into blocks" 1204, and this may include dividing a frame into blocks to provide block granularity region class (skip, scroll, dirty for example) assignments and the optimal partitioning as described above, and by one form providing uniform block sizes throughout the frame, such as the smallest possible divisions for a coding standard, here 4×4 sub-division blocks for the HEVC example.

Process 1200 may include "determine region classifications for partitioned blocks" 1206, and this may include determining the class of a block when not already provided by comparing the region address to the block address. The details are explained above.

Optionally, process 1200 may include "modify partitioning based on region assignments" 1208, and here to provide the modified or optimal partitioning by aggregating blocks with like region class assignments until the largest acceptable CTB block size is formed.

Process 1200 may include "store region-based and/or block-based display content information and block arrangement if present" 1210, where the blocks and the data for each block is saved as mentioned above.

Process 1200 may include "provide display content information to the encoder" 1211, where the data is then made accessible to the encoder and may be provided upon query from the encoder or otherwise continuously when a video sequence is present. Many other options are possible.

Process 1200 may continue with "receive display content information and block arrangement if present" 1212, where the data is obtained by the encoder.

Process 1200 then may include "consider metadata-based block partitions for CTB partition decisions" 1214, which as mentioned above, may be to provide further CTB sub-divisions based on the metadata, and determined by the encoder.

Process 1200 may include "provide metadata-based modified prediction partitions" 1216, and when present, alternatively providing sub-divisions or lack thereof in a block arrangement that is to be used instead of any block arrangement formed by the encoder.

Process 1200 may include "provide motion vectors for partitions for inter-prediction" 1218, and based on any of the sets of block arrangements, the motion estimation may be based on the encoder's block arrangement without display metadata influence, the encoder's CTB block arrangement modified by using the display metadata content information, or the metadata-based modified prediction partitions. These may be used to form the dirty block predictions for example.

Process 1200 then may include "provide prediction mode selections based, at least in part, on the display content information" 1219, and here by coding a block according to its region class assignment whether the class is provided on the block granularity or provided on a region-only basis or both. The details are provided above with operation 800, 900, and 1000.

Otherwise, process 1200 may include "transmit coded bitstream with image data, mode selection, MVs, partitions" 1220. Final prediction mode decision for the correct block is provided for compression and streaming to the decoder, while the predicted image data is provided to determine a residual to compress and transmit as well. It will be appreciated that the residual maybe a distortion already computed for prediction mode selection, and may be re-used as the residual.

While implementation of example process 400, 500, 600, and/or 900 may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Referring to FIG. 13, an example image processing system (or video coding system) 1300 for providing video coding may be arranged in accordance with at least some implementations of the present disclosure. In the illustrated implementation, system 1300 may include one or more central processing units or processors 1303 including fixed function hardware such as VMEs, processing unit(s) 1320 to provide the encoder and decoder discussed herein, one or more imaging devices 1301 to capture images, an antenna 1312 to receive or transmit image data, a display device 1305, and one or more memory stores 1306. Processor(s) 1303, memory store 1306, and/or display device 1305 may be capable of communication with one another, via, for example, a bus, wires, or other access. In various implementations, display device 1305 may be integrated in system 1300 or implemented separately from system 1300.

As shown in FIG. 13, and discussed above, the processing unit 1320 may have logic circuitry 1350 as already described above with the description of process 1200. A video decoder 1340 could be provided as well. These units of the logic circuitry provide many of the functions described herein and as explained with the processes described herein.

As will be appreciated, the modules illustrated in FIG. 13 may include a variety of software and/or hardware modules and/or modules that may be implemented via software or hardware or combinations thereof. For example, the modules may be implemented as software via processing units 1320 or the modules may be implemented via a dedicated hardware portion. Also, system 1300 may be implemented in a variety of ways. For example, system 1300 (excluding display device 1305) may be implemented as a single chip or device having an accelerator or a graphics processor unit (GPU) which may or may not have image signal processors (ISPs), a quad-core central processing unit, and/or a memory controller input/output (I/O) module. In other examples, system 1300 (again excluding display device 1305) may be implemented as a chipset or a system on a chip (SoC). It will be understood antenna 1312 could be used to receive image data for encoding as well.

Otherwise, processor(s) 1303 may include any suitable implementation including, for example, microprocessor(s), multicore processors, application specific integrated circuits, chip(s), chipsets, programmable logic devices, graphics cards, integrated graphics, general purpose graphics processing unit(s), fixed function GPUs, other accelerators, or the like. The implementation is not limited as long as kernels used to perform video coding prediction tasks can use software, firmware, and/or hardware to run on execution units that can call fixed function hardware such as the VMEs 1006 to efficiently perform repetitive computations such as for block-matching or spatial dependency calculations, or other tasks, and consistent with the description above. The VMEs may be in the form of a block in the hardware whether dedicated or not for this purpose. This may be placed in the graphics hardware, or could be a discrete GPU.

In addition, memory stores 1306 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1306 also may be implemented via cache memory.

In various implementations, the example video coding system 1300 may use the imaging device 1301 to form or receive captured image data. This can be implemented in various ways. Thus, in one form, the image processing system 1300 may be one or more digital cameras or other image capture devices, and imaging device 1301, in this case, may be the camera hardware and camera sensor software, module, or component 1350. In other examples, video coding system 1300 may have an imaging device 1301 that includes or may be one or more cameras, and logic modules 1350 may communicate remotely with, or otherwise may be communicatively coupled to, the imaging device 1301 for further processing of the image data.

Thus, video coding system 1300 may be, or may be part of, or may be in communication with, a smartphone, tablet, laptop, or other mobile device such as wearables including smart glasses, smart headphones, exercise bands, and so forth. In any of these cases, such technology may include a camera such as a digital camera system, a dedicated camera device, or an imaging phone or tablet, whether a still picture or video camera, camera that provides a preview screen, or some combination of these. Thus, in one form, imaging device 1301 may include camera hardware and optics including one or more sensors as well as auto-focus, zoom, aperture, ND-filter, auto-exposure, flash, and actuator controls. The imaging device 1301 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. In other examples, an RGB-Depth camera and/or microphone-array might be used in addition to or in the alternative to a camera sensor. In some examples, imaging device 1301 may be provided with an eye tracking camera. Otherwise, the imaging device 1301 may be any other device that records, displays or processes digital images such as video game panels or consoles, set top boxes, and so forth.

As illustrated, any of these components may be capable of communication with one another and/or communication with portions of logic modules 1350 and/or imaging device 1301. Thus, processors 1303 may be communicatively coupled to both the image device 1301 and the logic modules 1350 for operating those components. Although image processing system 1300, as shown in FIG. 10, may include one particular set of blocks or actions associated with particular components or modules, these blocks or actions may be associated with different components or modules than the particular component or module illustrated here.

Figure 14:
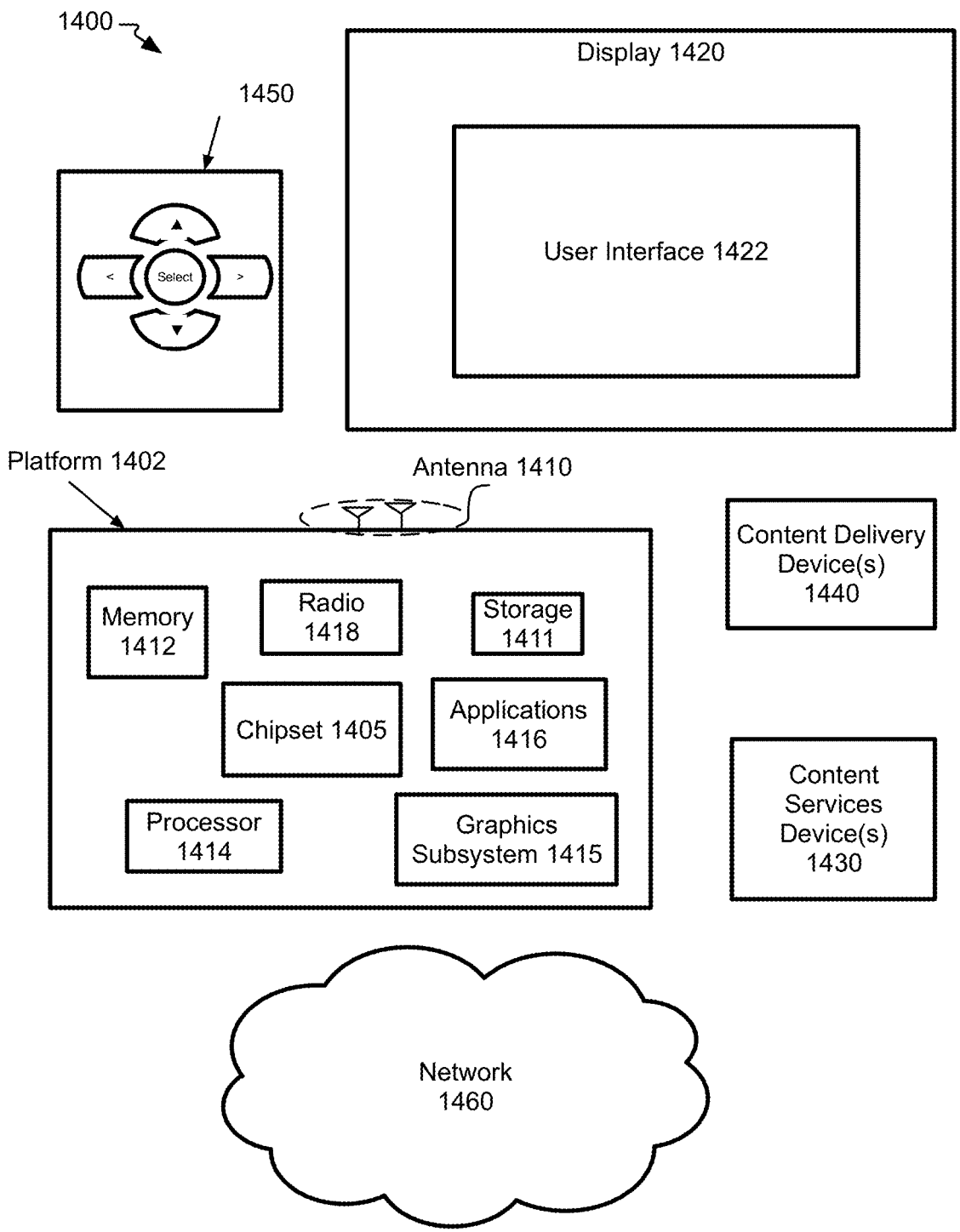
FIG. 14 is an illustrative diagram of another example system.

Referring to FIG. 14, an example system 1400 in accordance with the present disclosure and various implementations may embody system 1300 for example, and may be a media system although system 1400 is not limited to this context. For example, system 1400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1301400 includes a platform 1402 communicatively coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402 and/or display 1420. Each of these components is described in greater detail below.

In various implementations, platform 1402 may include any combination of a chipset 1405, processor 1414, memory 1412, storage 1411, graphics subsystem 1415, applications 1416 and/or radio 1418 as well as antenna(s) 1410. Chipset 1405 may provide intercommunication among processor 1414, memory 1412, storage 1411, graphics subsystem 1415, applications 1416 and/or radio 1418. For example, chipset 1405 may include a storage adapter (not depicted) capable of providing intercommunication with storage 1411.

Processor 1414 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1414 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1411 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1411 may include technology to increase the storage performance enhanced protection for valuable digital media when multiple hard drives are included, for example.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, Display Port, wireless HDMI, and/or wireless HD compliant techniques. Graphics subsystem 1415 may be integrated into processor 1414 or chipset 1405. In some implementations, graphics subsystem 1415 may be a stand-alone card communicatively coupled to chipset 1405.

The graphics and/or video processing techniques described herein may be implemented in various hardware architectures including fixed function hardware such as video motion estimation (VME) engines or similar parallel processing circuits. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any television type monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and/or content, and any other similar device capable of unidirectionally or bidirectionally communicating content between content providers and platform 1402 and/display 1420, via network 1460 or directly. It will be appreciated that the content may be communicated unidirectionally and/or bidirectionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of controller 1450 may be used to interact with user interface 1422, for example. In implementations, navigation controller 1450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1450 may be replicated on a display (e.g., display 1420) by movements of a pointer, cursor, focus ring, or other visual indicators displayed on the display. For example, under the control of software applications 1416, the navigation features located on navigation controller 1450 may be mapped to virtual navigation features displayed on user interface 1422, for example. In implementations, controller 1450 may not be a separate component but may be integrated into platform 1402 and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off." In addition, chipset 1405 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1301400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various implementations, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various implementations, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 14.

Figure 15:
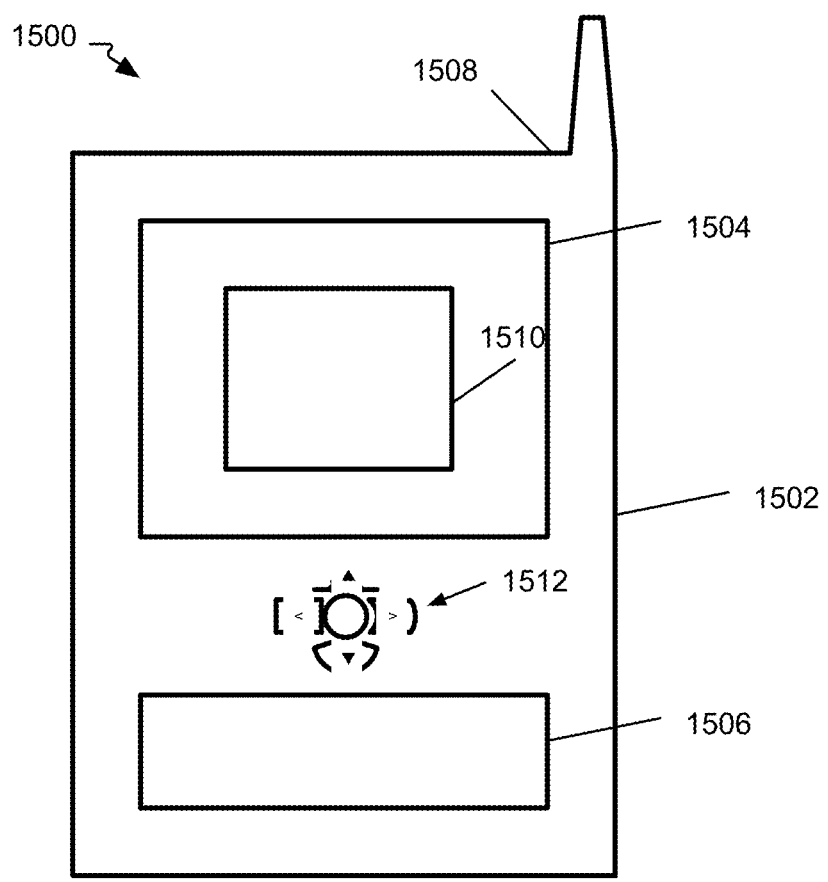
FIG. 15 illustrates another example device, all arranged in accordance with at least some implementations of the present disclosure.

As described above, system 1300 or 1400 may be implemented in varying physical styles or form factors. FIG. 15 illustrates implementations of a small form factor device 1500 in which system 1300 or 1400 may be implemented. In implementations, for example, device 1500 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile interne device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 15, device 1500 may include a housing 1502, a display 1504, an input/output (I/O) device 1506, and an antenna 1508. Device 1500 also may include navigation features 1512. Display 1504 may include any suitable screen 1510 on a display unit for displaying information appropriate for a mobile computing device. I/O device 1506 may include any suitable I/O device for entering information into a mobile computing device. Examples for I/O device 1506 may include an alphanumeric keyboard, a numeric keypad, a touch pad, input keys, buttons, switches, rocker switches, microphones, speakers, voice recognition device and software, and so forth. Information also may be entered into device 1500 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects described above may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

A computer-implemented method of video coding obtaining temporal display content information of image data of frames of a frame sequence and related to the comparison of at least two frames of the frame sequence and to be used to render the frames; obtaining pixel image data of the frames to encode the frame sequence; and determining a prediction mode of at least one portion of at least one frame of the frame sequence to be used to encode the pixel image data of the at least one portion and based on, at least in part, the temporal display content information.

The method also may include that wherein the temporal display content information comprises information that the at least one portion has at least one of: dirty image data wherein the image data of the at least one portion is new image data of the frame relative to the image data on another frame in the frame sequence, static image data wherein the image data of the at least one portion is the same content and position on the frame relative to the image data on another frame in the frame sequence, and scrolled image data wherein the image data of the at least one portion has the same content but in a different position on the frame relative to the position of the image data on another frame in the frame sequence; the method comprising providing the temporal display content information in a block granularity that matches one or more prediction unit partition sizes available for encoding the video sequence, wherein at least one of: (1) the temporal display content information is provided to the encoder in a large block granularity wherein large is relative to sub-division block sizes, and is treated as a dirty block when at least one sub-division block of the large block is considered a dirty block, and (2) the smallest block subdivision compatible with an encoder coding standard is the block granularity level of the temporal display content information; wherein individual blocks are assigned one of the region classes forming the temporal display content information.

The method also may comprising: at least one of: providing the block granularity temporal display content information to an encoder so that the encoder can use the block granularity temporal display content information to determine sub-divisions of blocks as prediction unit partitions; and using encoder based prediction unit partitions rather than temporal display content information based partitions provided to or formed by the encoder for the same portion of the frame; coding a skip block of the at least one portion as skip without subdividing the block and without determining a prediction mode for sub-divisions of the block; and coding a scroll block of the at least one portion as inter-prediction and a motion vector that is the distance and direction of a scroll offset, and without determining predictions for sub-divisions of the scroll block and without coding a residual for the scroll block.

By another approach, a computer-implemented system comprising: at least one display; at least one memory to store frames of a video sequence wherein individual frames have image data with pixels divided into blocks; at least one processor communicatively coupled to the at least one of the memory and display; and an encoder operated by the at least one processor and operated by: obtaining temporal display content information of image data of frames of a frame sequence and related to the comparison of at least two frames of the frame sequence and to be used to render the frames; and obtaining pixel image data of the frames to encode the frame sequence; determining a prediction mode of at least one portion of at least one frame of the frame sequence to be used to encode the pixel image data of the at least one portion and based on, at least in part, the temporal content information.

The system also may include wherein the temporal display content information comprises information that the at least one portion has at least one of: dirty image data wherein the image data of the at least one portion is new image data of the frame relative to the image data on another frame in the video sequence, static image data wherein the image data of the at least one portion is the same content and position on the frame relative to the image data on another frame in the video sequence, and scrolled image data wherein the image data of the at least one portion has the same content but in a different position on the frame relative to the position of the image data on another frame in the video sequence; wherein the frames are divided into metadata blocks and a region class of the temporal display content information is assigned to each block to use the metadata blocks to determine whether further subdivisions are needed for prediction unit partitioning by the encoder; wherein at least one of: region locations of the region classes are provided to the encoder regardless of metadata block positions on the frames, and are used to determine a prediction mode of blocks of the encoder; and wherein the region class and the metadata blocks are used to determine a prediction mode of the metadata block; wherein the frames are divided into blocks, and wherein individual blocks of the frames are provided metadata to provide to an encoder, the metadata indicating a block size, a block position on the frame, a region class of the block comprising at least one of skip, scroll, and dirty, a scroll direction when the block is classified as scroll, and a scroll distance when the block is classified as scroll; and wherein the frames are divided into 4×4 pixel sub-blocks individually assigned a region class of skip, scroll, or dirty.

By another implementation, a computer-readable medium having stored thereon instructions that when executed cause a computing device to operate by: obtaining temporal display content information of image data of frames of a frame sequence and related to the comparison of at least two frames of the frame sequence and to be used to render the frames; obtaining pixel image data of the frames to encode the frame sequence; and determining a prediction mode of at least one portion of at least one frame of the frame sequence to be used to encode the pixel image data of the at least one portion and based on, at least in part, the temporal content information.

The computer-readable medium wherein the temporal display content information comprises information that the at least one portion has at least one of: dirty image data wherein the image data of the at least one portion is new image data of the frame relative to the image data on another frame in the frame sequence, static image data wherein the image data of the at least one portion is the same content and position on the frame relative to the image data on another frame in the frame sequence, and scrolled image data wherein the image data of the at least one portion has the same content but in a different position on the frame relative to the position of the image data on another frame in the frame sequence; the computing device caused to operate by providing the temporal display content information in a block granularity that matches one or more prediction unit partition sizes available for encoding the video sequence, wherein at least one of: (1) the temporal display content information is provided to the encoder in a large block granularity wherein large is relative to sub-division block sizes, and is treated as a dirty block when at least one sub-division block of the large block is considered a dirty block, and (2) the smallest block subdivision compatible with an encoder coding standard is the block granularity level of the temporal display content information; wherein individual blocks are assigned one of the region classes forming the temporal display content information; and the computing device caused to operate by: at least one of: providing the block granularity temporal display content information to an encoder so that the encoder can use the block granularity temporal display content information to determine sub-divisions of blocks as prediction unit partitions; and using encoder based prediction unit partitions rather than temporal display content information based partitions provided to or formed by the encoder for the same portion of the frame; coding a skip block of the at least one portion as skip without subdividing the block and without determining a prediction mode for sub-divisions of the block; and coding a scroll block of the at least one portion as inter-prediction and a motion vector that is the distance and direction of a scroll offset, and without determining predictions for sub-divisions of the scroll block and without coding a residual for the scroll block.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A computer-implemented method of video coding comprising:
    obtaining temporal display content information of image data of at least one area of non-compressed frames of a frame sequence to be rendered, wherein each area is less than an entire frame, wherein the temporal display content information comprises one of at least three available rendering classifications of dirty, scroll, or skip, and wherein the rendering classification is generated to render an image regardless of whether or not the frame sequence is to be provided to an encoder to be encoded;
    obtaining pixel image data of the frames to separately encode the frame sequence; and
    encoding the pixel image data to display the frame sequence at a device remote from a device rendering the frame sequence, the encoding comprising determining a prediction mode of at least one portion of at least one frame of the frame sequence and determining the prediction mode based on, at least in part, the temporal display content information.

2. The method of claim 1 wherein the temporal display content information comprises information that the at least one portion has at least one among three available options of:

dirty image data wherein the image data of the at least one portion is new image data of the frame relative to the image data on another frame in the frame sequence, static image data wherein the image data of the at least one portion is the same content and position on the frame relative to the image data on another frame in the frame sequence, and scrolled image data wherein the image data of the at least one portion has the same content but in a different position on the frame relative to the position of the image data on another frame in the frame sequence.

3. The method of claim 1 wherein the temporal display content information is provided to an encoder in the form of locations of regions each with a different region class and without dividing the regions into blocks; and the method comprising locating blocks of the frames formed at the encoder at one of the regions.

4. The method of claim 1 comprising providing the temporal display content information in a block granularity that matches one or more prediction unit partition sizes available for encoding the video sequence.

5. The method of claim 4 wherein the temporal display content information is provided to an encoder in a large block granularity and is treated as a dirty block when at least one sub-division block of the large block is considered a dirty block.

6. The method of claim 4 wherein the smallest block subdivision compatible with an encoder coding standard is the block granularity level of the temporal display content information.

7. The method of claim 1 comprising dividing the frames into blocks to form a block granularity of the temporal display content information wherein individual blocks are assigned one of region classes forming the temporal display content information; and providing the block granularity temporal display content information to an encoder so that the encoder can use the block granularity temporal display content information to determine sub-divisions of blocks as prediction unit partitions.

8. The method of claim 7 comprising using encoder based prediction unit partitions rather than temporal display content information based partitions provided to or formed by the encoder for the same portion of the frame.

9. The method of claim 7 comprising providing blocks with prediction unit partitions based on temporal display content information for inter-prediction, intra-prediction and/or prediction mode selection.

10. The method of claim 7 comprising aggregating blocks assigned with the same region class of the temporal display content information to form a metadata-based modified block arrangement to be used by the encoder instead of a prediction unit partitioning of the encoder formed without using the temporal display content information.

11. The method of claim 1 comprising coding a skip block of the at least one portion as skip without subdividing the block and without determining a prediction mode for subdivisions of the block.

12. The method of claim 1 comprising coding a scroll block of the at least one portion as inter-prediction and a motion vector that is the distance and direction of a scroll offset, and without determining predictions for sub-divisions of the scroll block and without coding a residual for the scroll block.

13. A method of video coding comprising:

obtaining temporal display content information of image data of at least one area of non-compressed frames of a frame sequence to be rendered, wherein each area is less than an entire frame, wherein the temporal display content information comprises one of at least three available rendering region classifications of dirty, scroll, or skip wherein the rendering classification is generated to render an image regardless of whether or not the frame sequence is to be provided to an encoder to be encoded;

obtaining pixel image data of the frames to separately encode the frame sequence to display the frame sequence on a device remote from a device to be used for the rendering; and dividing the frames into blocks;

assigning one of the region classifications of the temporal display content information to individual blocks; and providing block data of the blocks comprising the region classification of the blocks and to an encoder to determine prediction modes for the blocks using the region classifications and to compress the image data of the frames.

14. The method of claim 13 wherein the temporal display content information comprises information that the at least one portion has at least one data type of: dirty image data, static image data, and scrolled image data, and the method comprising determining or omitting prediction or residual generation to perform encoding of the portion and depending on the data type of data of the portion.

15. The method of claim 13 comprising providing the temporal display content information in a block granularity that matches one or more prediction unit partition sizes available for encoding the video sequence.

16. A computer-implemented system comprising:

at least one display;

at least one memory to store frames of a video sequence wherein individual frames have image data with pixels divided into blocks; and at least one processor communicatively coupled to the at least one of the memory and display, and the at least one processor being arranged to operate by:

obtaining temporal display content information of image data of at least one area of non-compressed frames of a frame sequence to be rendered, wherein each area is less than an entire frame, wherein the temporal display content information comprises one of at least three available rendering classifications of dirty, scroll, or skip wherein the rendering classification is generated to render an image regardless of whether or not the frame sequence is provided to an encoder to be encoded;

obtaining pixel image data of the frames to separately encode the frame sequence; and encoding the pixel image data to display the frame sequence at a device remote from a device to be used to perform the rendering, the encoding comprising determining a prediction mode of at least one portion of at least one frame of the frame sequence and determining the prediction mode based on, at least in part, the temporal display content information.

17. The system of claim 16 wherein the temporal display content information comprises information that the at least one portion has at least one among three available options of:

dirty image data wherein the image data of the at least one portion is new image data of the frame relative to the image data on another frame in the video sequence, static image data wherein the image data of the at least one portion is the same content and position on the frame relative to the image data on another frame in the video sequence, and scrolled image data wherein the image data of the at least one portion has the same content but in a different position on the frame relative to the position of the image data on another frame in the video sequence.

18. The system of claim 16 comprising an encoder, wherein the frames are divided into metadata blocks and a region class of the temporal display content information is assigned to each block to use the metadata blocks to determine whether further subdivisions are needed for prediction unit partitioning by the encoder.

19. The system of claim 18 wherein region locations of the region classes are provided to the encoder regardless of metadata block positions on the frames, and are used to determine a prediction mode of blocks of the encoder.

20. The system of claim 16 wherein the frames are divided into metadata blocks and a region class of the temporal display content information is assigned to each block and is used to determine a prediction mode of the metadata block.

21. The system of claim 16 wherein the frames are divided into blocks, and wherein individual blocks of the frames are provided metadata to provide to an encoder, the metadata indicating a block size, a block position on the frame, a region class of the block comprising at least one of skip, scroll, and dirty, a scroll direction when the block is classified as scroll, and a scroll distance when the block is classified as scroll.

22. The system of claim 16 wherein the at least one processor being arranged to operate by using encoder based prediction unit partitions rather than temporal display content information based partitions provided to or formed by the encoder for at least some of the portions of the frame.

23. A non-transitory computer-readable medium having stored thereon instructions that when executed cause a computing device to operate by:

generating temporal display content information of image data of at least one area of non-compressed frames of a frame sequence to be rendered, wherein each area is less than an entire frame, wherein the temporal display content information comprises one of at least three available rendering classifications of dirty, scroll, or skip wherein the rendering classification is generated to render an image regardless of whether or not the frame sequence is to be provided to an encoder to be encoded; and providing the temporal display content information to an encoder to display the frame sequence at a device remote from a device to be used to perform the rendering of the frame sequence, wherein the encoder separately determines a prediction mode of at least one portion of at least one frame of the frame sequence and determines the prediction mode based on, at least in part, the temporal display content information.

24. The computer-readable medium of claim 23 wherein the instructions cause the computing device to operate by providing the temporal display content information in a block granularity that matches one or more prediction unit partition sizes available for encoding the video sequence.

25. The computer-readable medium of claim 23 wherein the instructions cause the computing device to operate by providing the temporal display content information in the form of locations of regions each with a different region class and without dividing the regions into blocks.

* * * * *